(12) United States Patent
Li et al.

(10) Patent No.: US 12,376,605 B2
(45) Date of Patent: Aug. 5, 2025

(54) ICE CREAM MAKER

(71) Applicant: Guangdong Link Plus Technology Group Co., Ltd, Guangdong (CN)

(72) Inventors: Long Li, Guangdong (CN); Huasheng Lai, Guangdong (CN); Junqiang He, Guangdong (CN); Pan Chen, Guangdong (CN)

(73) Assignee: Guangdong Link Plus Technology Group Co., Ltd, Guangdong (CN)

( * ) Notice: Subject to any disclaimer, the term of this patent is extended or adjusted under 35 U.S.C. 154(b) by 0 days.

(21) Appl. No.: 18/799,101

(22) Filed: Aug. 9, 2024

(65) Prior Publication Data

US 2025/0228264 A1    Jul. 17, 2025

Related U.S. Application Data

(63) Continuation-in-part of application No. 18/430,992, filed on Feb. 2, 2024.

(30) Foreign Application Priority Data

Jan. 11, 2024 (CN) .......................... 202410045964.1
May 20, 2024 (CN) .......................... 202410625322.9

(Continued)

(51) Int. Cl.
*A47J 43/044* (2006.01)
*A23G 9/12* (2006.01)
(Continued)

(52) U.S. Cl.
CPC .............. *A23G 9/224* (2013.01); *A23G 9/12* (2013.01); *A47J 43/044* (2013.01); *A47J 43/082* (2013.01); *A47J 2043/04472* (2013.01)

(58) Field of Classification Search
CPC .................... A47J 43/044; A47J 43/082; A47J 2043/04472
See application file for complete search history.

(56) References Cited

U.S. PATENT DOCUMENTS

| | | | | |
|---|---|---|---|---|
| 1,327,900 A | * | 1/1920 | Black ................... | A47J 43/044 366/207 |
| 1,392,875 A | * | 10/1921 | Langhaus ............. | A47J 43/044 366/207 |

(Continued)

FOREIGN PATENT DOCUMENTS

| | | | | |
|---|---|---|---|---|
| FR | 1335639 A | * | 2/1963 | ............ A47J 43/044 |
| FR | 3110066 A1 | * | 11/2021 | ............ A47J 43/044 |

(Continued)

OTHER PUBLICATIONS

English translation of FR 1335639.*

(Continued)

*Primary Examiner* — Faye Francis
(74) *Attorney, Agent, or Firm* — ScienBiziP, P.C.

(57) ABSTRACT

The present disclosure provides an ice cream maker. The ice cream maker including: a cutter configured for mixing and cutting food materials; a driving structure for converting electrical energy into kinetic energy; a lifting member driven by the driving structure to move in a longitudinal direction of the lifting member; and a receiving cavity configured for accommodating the driving structure and the lifting member, and formed by an upper housing and a lower housing; wherein the cutter is detachably connected to the upper housing; the upper housing is driven by the lifting member to move in the longitudinal direction so as to vary a distance in the longitudinal direction between a top end of the upper housing and a bottom end of the lower housing.

20 Claims, 33 Drawing Sheets

(30) Foreign Application Priority Data

| May 20, 2024 | (CN) | .......................... 202421105988.3 |
| May 20, 2024 | (CN) | .......................... 202421105993.4 |
| May 20, 2024 | (CN) | .......................... 202421105996.8 |
| May 20, 2024 | (CN) | .......................... 242421105970.3 |
| Jul. 22, 2024 | (CN) | .......................... 202421746176.7 |
| Jul. 30, 2024 | (CN) | .......................... 202421823183.2 |

(51) Int. Cl.
  *A23G 9/22* (2006.01)
  *A47J 43/08* (2006.01)

(56) References Cited

U.S. PATENT DOCUMENTS

| 1,418,099 | A | * | 5/1922 | Sigal | ..................... A47J 43/044 |
| | | | | | 185/39 |
| 1,473,163 | A | * | 11/1923 | Sas | ..................... A47J 43/044 |
| | | | | | 366/292 |
| 1,498,392 | A | * | 6/1924 | Levy | ..................... A47J 43/044 |
| | | | | | 416/234 |
| 1,569,049 | A | * | 1/1926 | Stufflebeam | .......... A47J 43/044 |
| | | | | | 416/129 |
| 1,615,875 | A | * | 2/1927 | Grigsby | ............... A47J 43/044 |
| | | | | | 416/142 |
| 1,768,927 | A | * | 7/1930 | Peters | ................ A47J 43/0705 |
| | | | | | 366/264 |
| 1,803,446 | A | * | 5/1931 | Warrick | ............... A47J 43/044 |
| | | | | | 248/560 |
| 2,008,106 | A | * | 7/1935 | Lawrence | ............. A47J 43/044 |
| | | | | | 366/197 |
| 2,222,601 | A | * | 11/1940 | Blish | ...................... A23G 9/045 |
| | | | | | 366/206 |
| 5,104,050 | A | * | 4/1992 | Herbert | ................... A47J 42/26 |
| | | | | | 241/37.5 |
| 5,836,687 | A | * | 11/1998 | Khalid | .................. B01F 27/805 |
| | | | | | 366/207 |
| 9,131,806 | B1 | * | 9/2015 | Ochoa | ................ B01F 35/7139 |
| 11,419,458 | B2 | * | 8/2022 | Gardner | ............... A47J 43/044 |
| 2005/0201198 | A1 | * | 9/2005 | Farrell | ............... B01F 35/1453 |
| | | | | | 366/347 |
| 2008/0279040 | A1 | * | 11/2008 | Neilson | ..................... B08B 3/04 |
| | | | | | 366/206 |
| 2013/0344220 | A1 | * | 12/2013 | Farrell | ................... B65D 85/72 |
| | | | | | 426/531 |
| 2015/0313413 | A1 | * | 11/2015 | Ochoa | ................... B01F 27/806 |
| | | | | | 366/244 |
| 2016/0016133 | A1 | * | 1/2016 | Merritt | .................. B01F 35/186 |
| | | | | | 366/242 |
| 2019/0014948 | A1 | | 1/2019 | Cheung et al. | |
| 2019/0246842 | A1 | * | 8/2019 | Gardner | ............... A47J 43/044 |
| 2021/0274974 | A1 | * | 9/2021 | Abraham | ............ A47J 43/0755 |
| 2024/0188758 | A1 | * | 6/2024 | McCann | ............... A47J 43/044 |
| 2024/0237857 | A1 | * | 7/2024 | Leung | ................ A47J 43/0755 |

FOREIGN PATENT DOCUMENTS

| JP | S633760 A | 1/1988 |
| JP | 2004173651 A | 6/2004 |

OTHER PUBLICATIONS

International Search Report dated Mar. 13, 2025 for International Application No. PCT/CN2024/134031 which is the family application of the instant application.

\* cited by examiner

ICE CREAM MAKER

CROSS-REFERENCE TO RELATED APPLICATIONS

This application is a Continuation in part of US Patent Application with Ser. No. 18/430,992, filed on Feb. 2, 2024, which claimed priority to China Patent Application No 202410045964.1 filed on Jan. 11, 2024, and claims priority to CN Patent Application with Serial Number 202421105970.3 filed on May 20, 2024, China Patent Application Number 202421105993.4 filed on May 20, 2024, China Patent Application Number 202421105988.3 filed on May 20, 2024, China Patent Application Number 202410625322.9 filed on May 20, 2024, China Patent Application Number 202421105996.8 filed on May 20, 2024, China Patent Application Number 202421746176.7 filed on Jul. 22, 2024, China Patent Application Number 202421823183.2 filed on Jul. 30, the disclosure of which is incorporated herein by reference.

TECHNICAL FIELD

The present disclosure relates to an ice cream maker, and more particularly to a household ice cream maker.

BACKGROUND

As a household appliance, an ice cream maker is specially designed to make ice cream. As to traditional ice cream makers, fresh fruit or milk is generally used as main ingredients, and pre-frozen ingredients are stirred and crushed in multiple layers through a built-in cutter head. Through this process, not only the ingredients are mixed well, but also air is introduced during stirring, thereby giving the ice cream a denser and cream-like texture. The working principle of such a machine lies in that a cutter head encounters resistance from ingredients during rotation, and then air is introduced into the ingredients. As the cutter head continues to rotate and move up and down, the ingredients are gradually churned and fully mixed with air, and an ice cream structure that we are familiar with is finally formed.

However, for some ice cream makers on the market, a dual-motor system is adopted, with one motor controlling rotation of the cutter head while the other motor being responsible for up and down movement of the cutter head. Although this design allows for more precise control of a stirring process and a finer texture of the ice cream, several problems are presented in this type of ice cream makers. First, the configuration of dual motors increases production costs, leading to a higher market price of the machine. Secondly, dual motors also lead to an increase in the size of the main engine, thereby not only affecting portability and storage convenience of the machine, but also taking up more space in the kitchen.

Therefore, although ice cream makers with dual motors can be more powerful in terms of functions, their high cost and larger size limit their market penetration, especially for home users. In contrast, ice cream makers with a single motor are more popular with average consumers due to their lower cost, smaller size and relatively simple operation.

BRIEF DESCRIPTION OF DRAWINGS

Embodiments of the present disclosure will now be described, by way of embodiment, with reference to the attached figures.

DETAILED DESCRIPTION

First Embodiment

Figure 1:
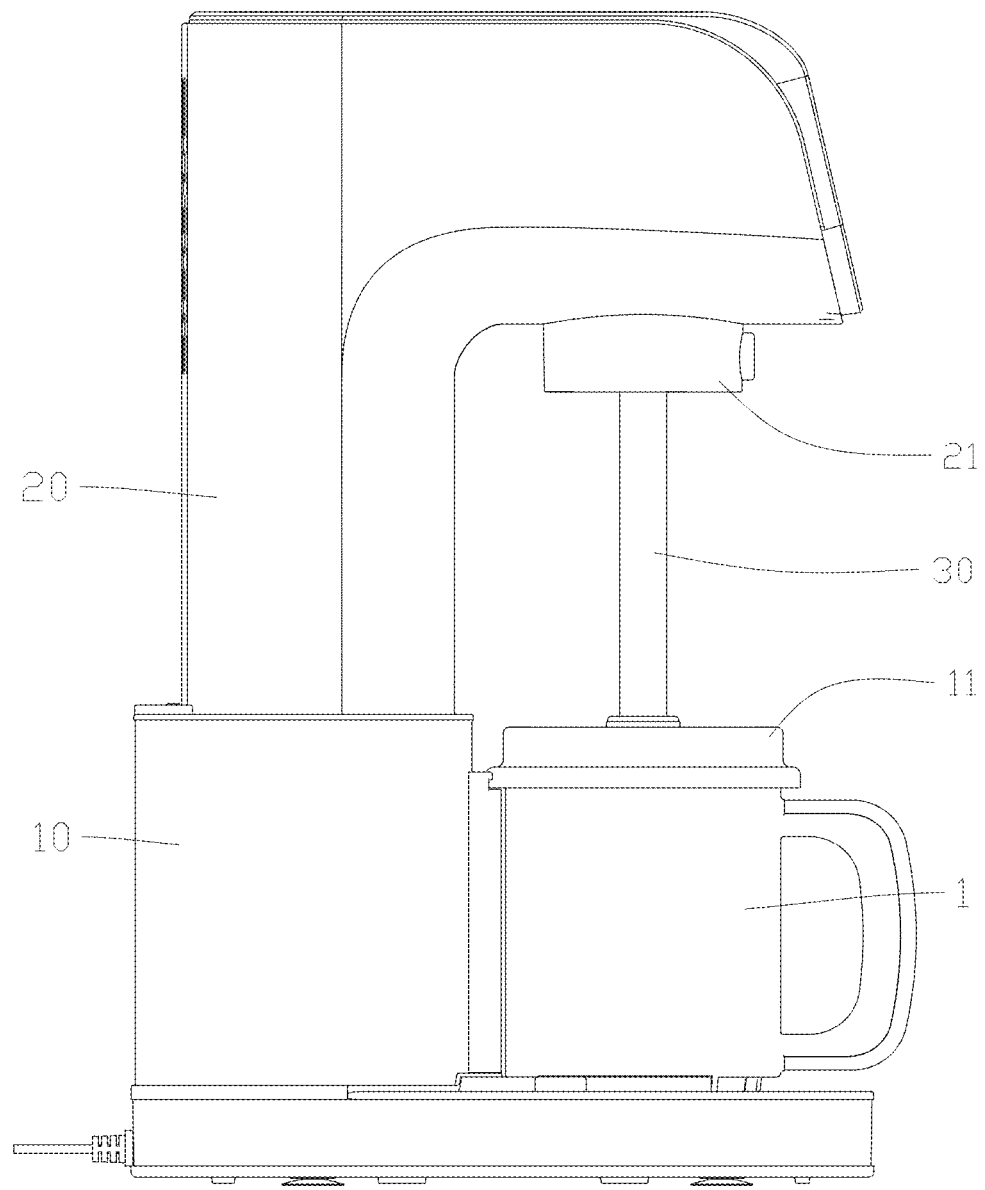
FIG. 1 is a diagram shows an ice cream maker according to a first embodiment of the present disclosure when the ice cream maker is at a first position.
Figure 2:
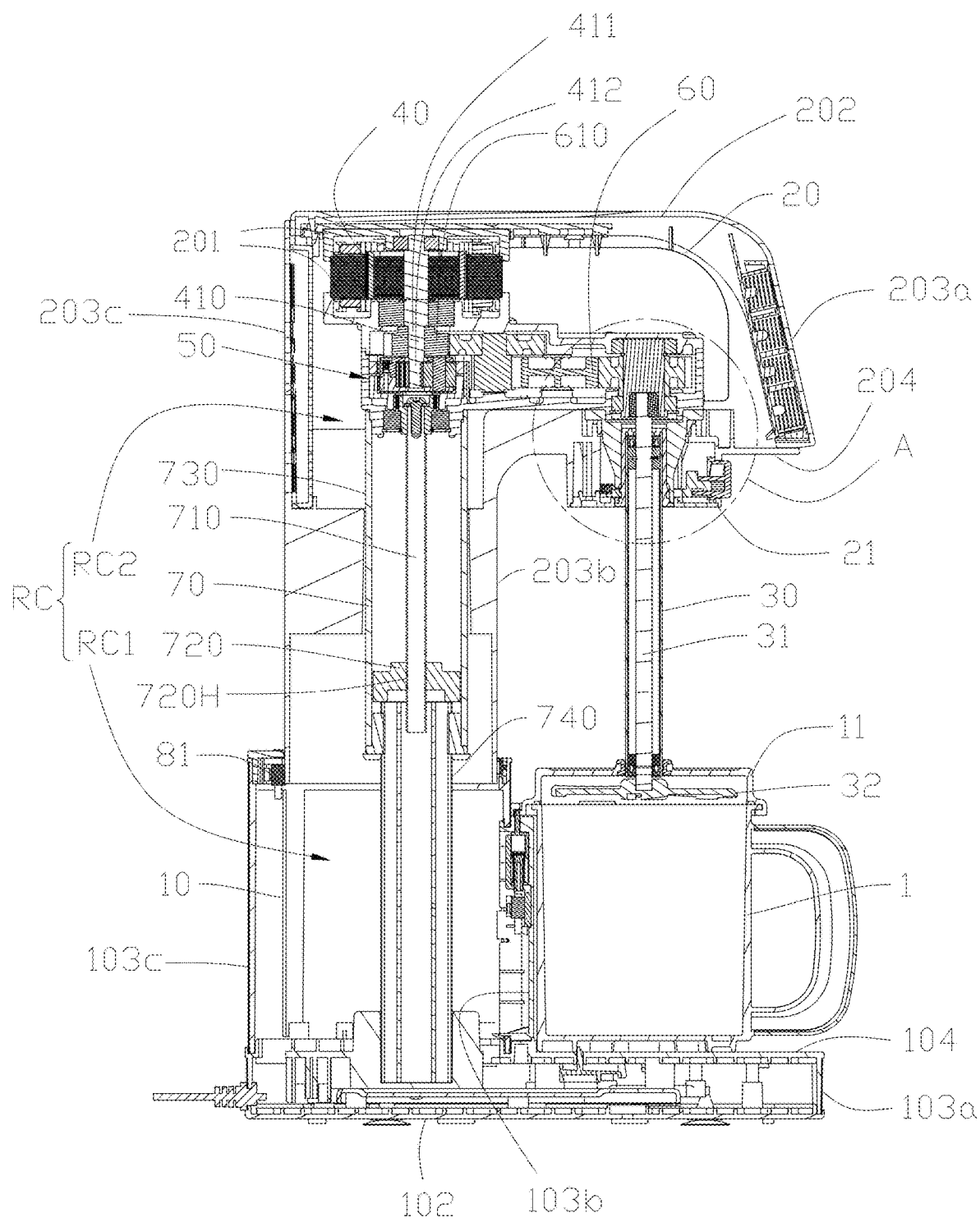
FIG. 2 is a sectional view of the composition of the ice cream maker shown in FIG. 1 when the ice cream maker is at a first position.
Figure 3:
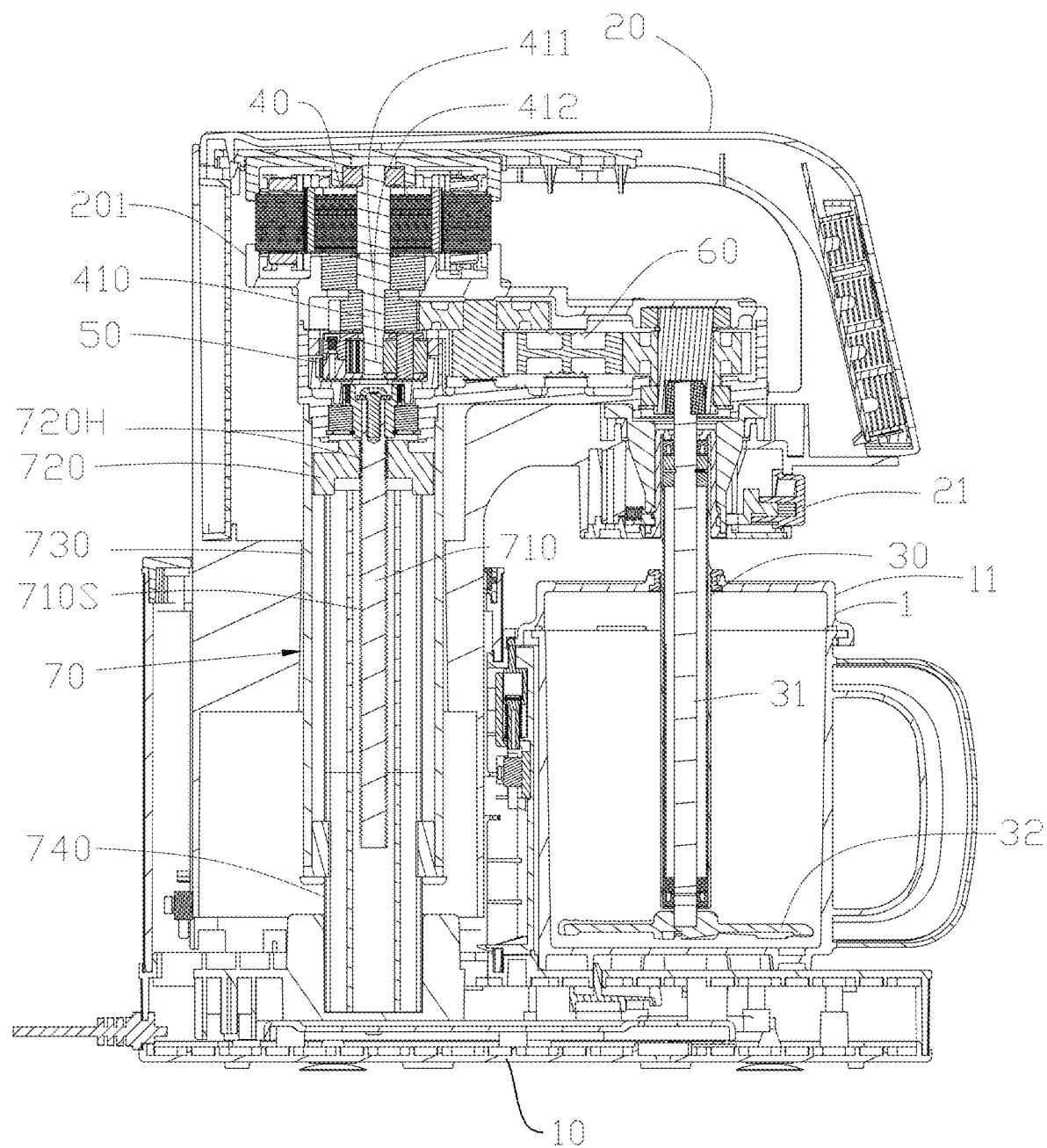
FIG. 3 is a sectional view of the composition of the ice cream maker shown in FIG. 1 when the ice cream maker is at a second position.
Figure 4:
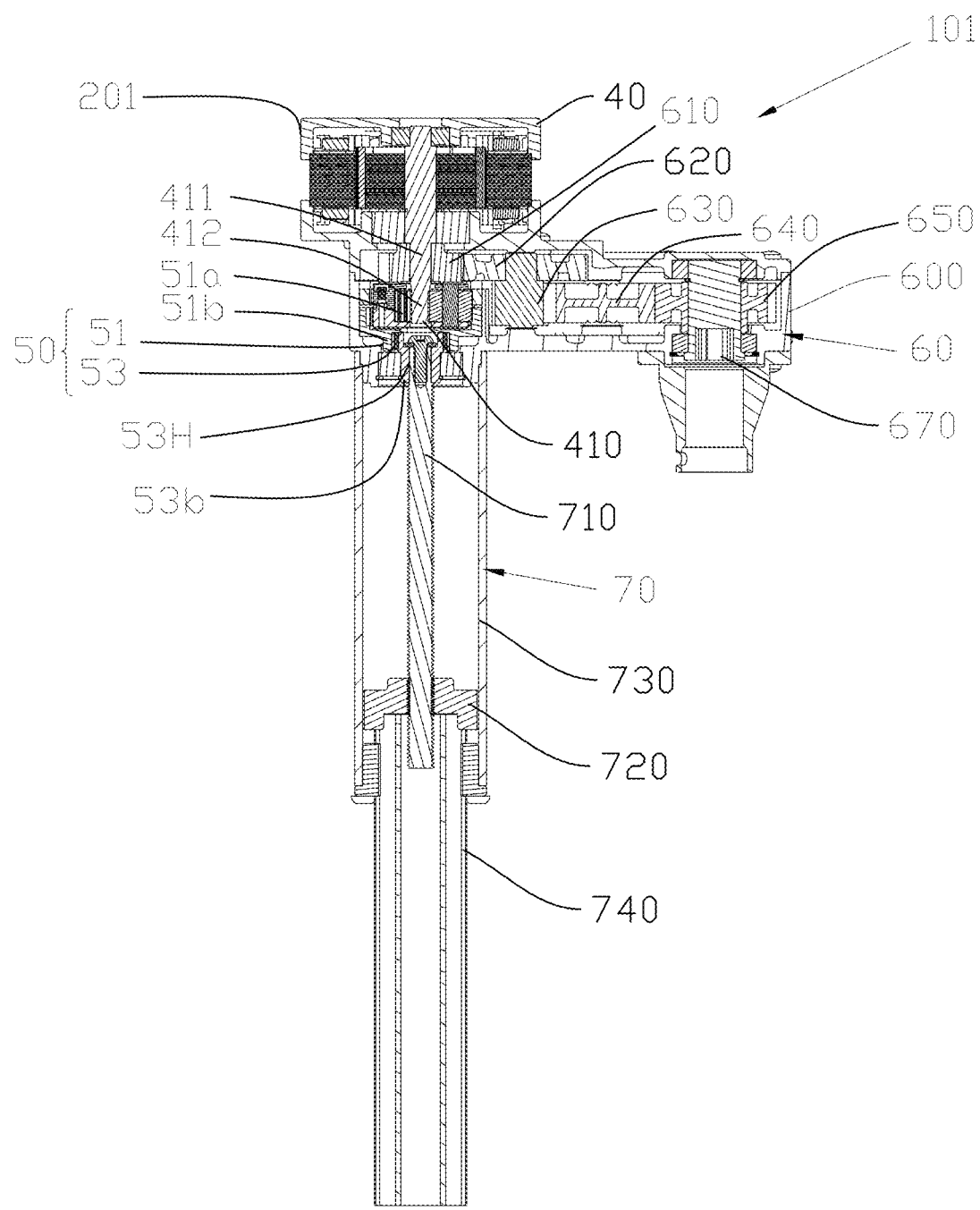
FIG. 4 is a sectional view of composition of a driving member, a first transmission member, a second transmission member and a lifting member of the ice cream maker shown in FIG. 1 when the ice cream maker is at the first position.
Figure 5:
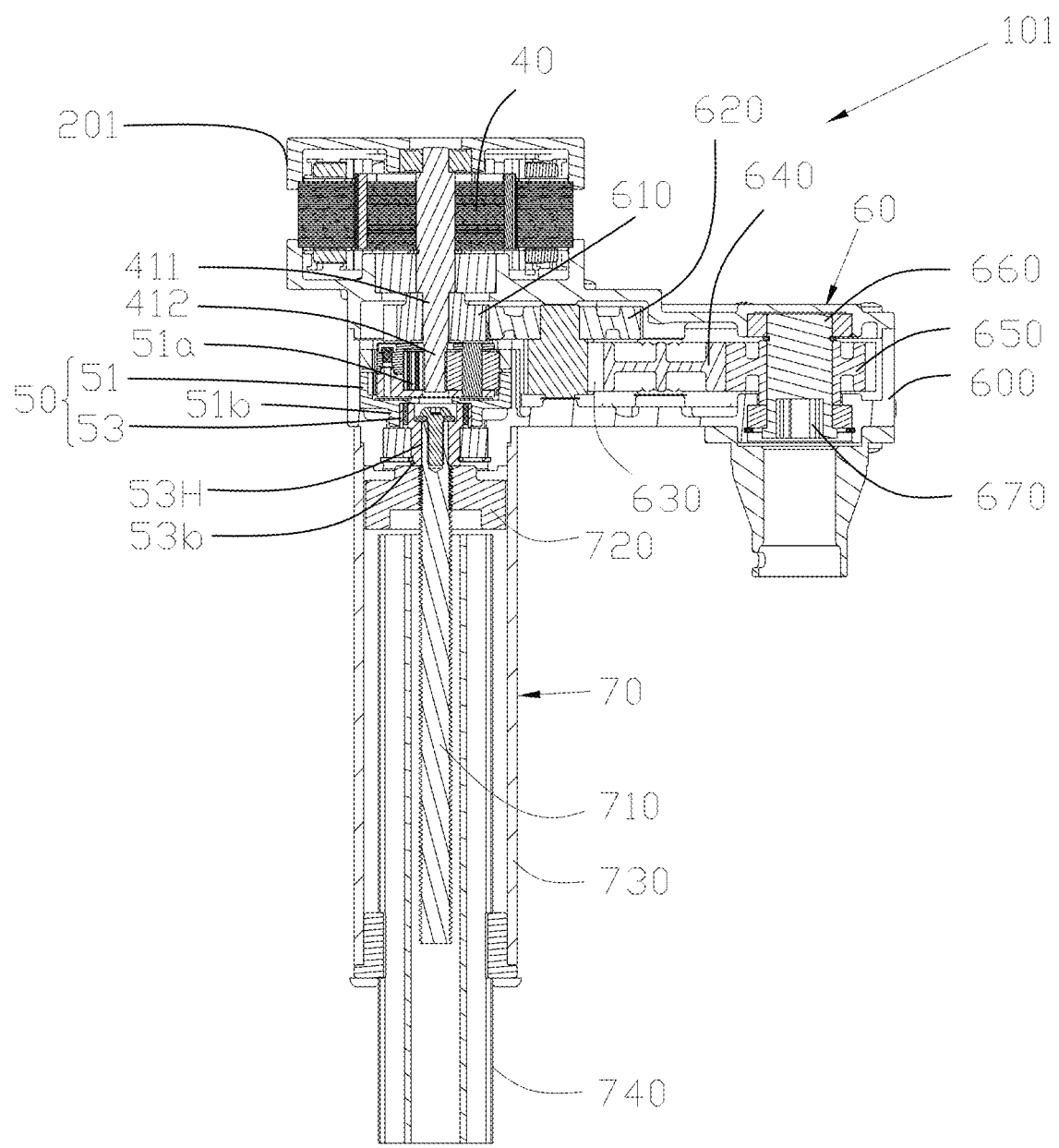
FIG. 5 is a sectional view of composition of the driving member, the first transmission member, the second transmission member and the lifting member of the ice cream maker shown in FIG. 1 when the ice cream maker is at the second position.
Figure 6:
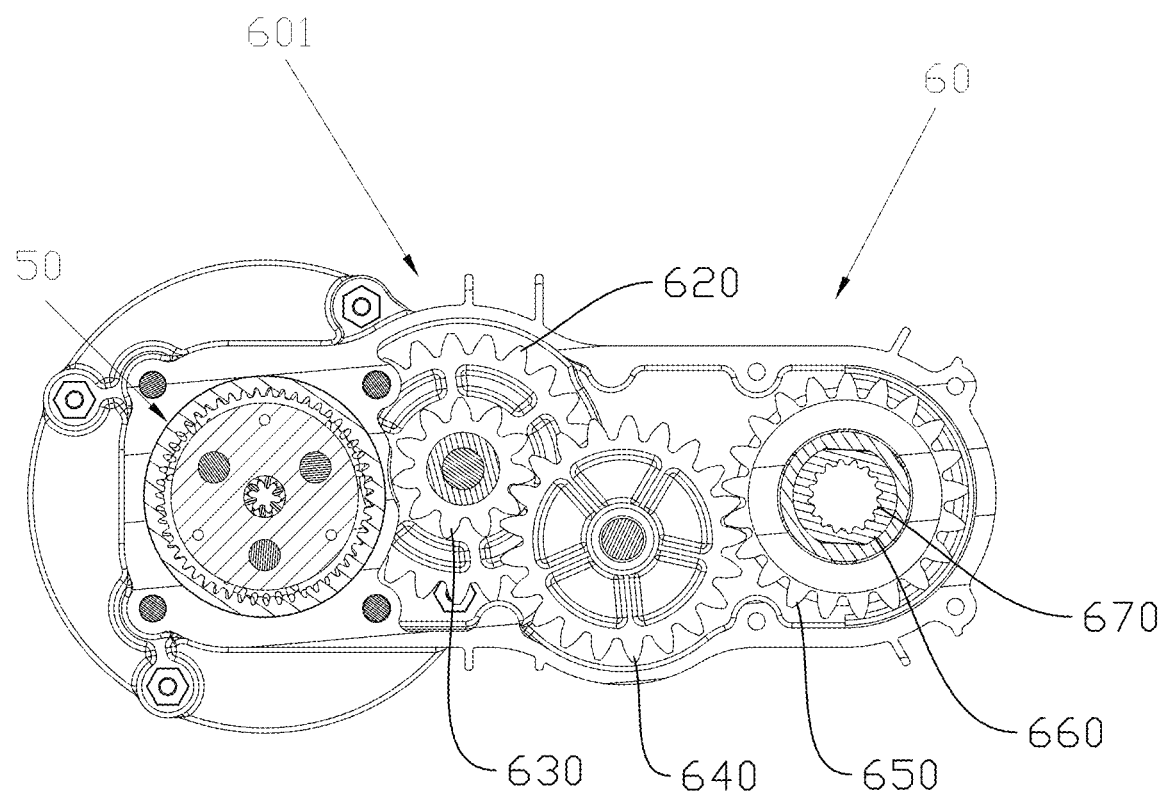
FIG. 6 is a sectional view of the second transmission member of the ice cream maker shown in FIG. 1 when viewed from one side.

Referring to FIG. 1 to FIG. 25, which show an ice cream maker 100 of the first embodiment of the present disclosure. Referring to FIG. 1 to FIG. 3, the ice cream maker 100 includes a lower housing 10, an upper housing 20, a cutter 30, a driving structure 101, a lifting member 70 and a container 1.

Figure 17:
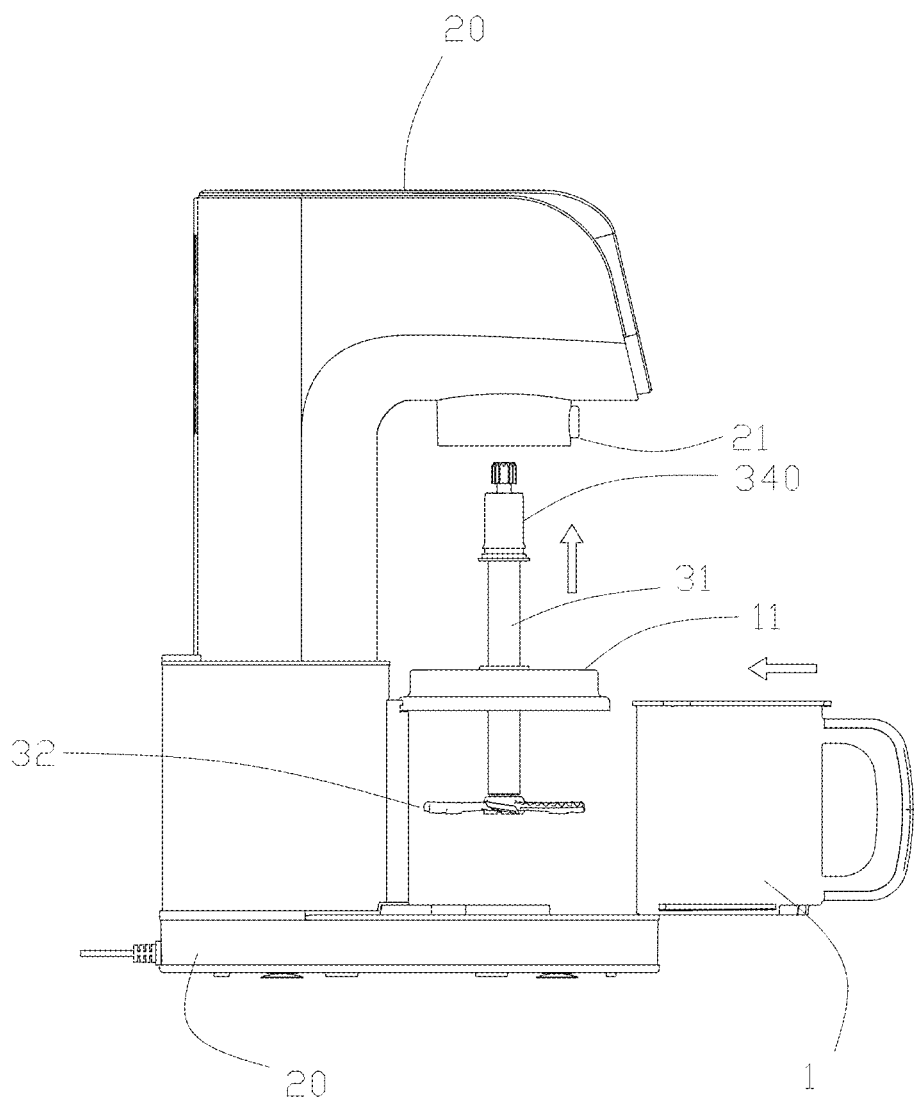
FIG. 17 is a schematic view showing the removal of a cutter and a container.

The upper housing 20 is moveably installed on the lower housing 10. Referring to FIG. 17, the container 1 is detachably installed on the lower housing 10. The driving structure 101 is installed within the upper housing 20 and converts electrical energy into kinetic energy. The lifting member 70 is installed within the upper housing 20 and the lower housing 10 and connected to the driving structure 101, such that under the driving of the driving structure 101, the lifting member 70 drives the upper housing 20 to move up and down relative to the lower housing 10, so as to vary a distance in the longitudinal direction between a top end of the upper housing and a bottom end of the lower housing and. The cutter 30 is detachably installed on a portion of the driving structure 101 inside the upper housing 20, and under the driving of the driving structure 101, the cutter 30 rotates, and under the driving of the lifting member 70, the cutter 30 moves up and down relative to the container 1 which moves longitudinally, and further the cutter 30 can rotate relative to the container 1 to shave frozen puree or ice blocks inside the container 1, and under the driving of the lifting member 70, the cutter 30 can move up and down relative to the container 1 to stir and mix shaved puree or ice blocks (food materials).

The lower housing 10 is L-shaped and includes a first portion arranged transversely and a second portion arranged vertically. The first portion is configured to be installed with a container 1, such that the container 1 is installed at a position below the cutter 30. The second portion is movably installed with an upper housing 20, such that the upper housing 20 is movably installed on the lower housing 10. The first portion of the lower housing 10 includes a bottom wall 102 (i.e., lower end), a side wall 103a connected to one end of the bottom wall 102 and extending from the bottom wall 102 towards the upper housing 20, and a top wall 104 connected to one end, away from the bottom wall 102, of the side wall 103a and disposed opposite the bottom wall 102. The top wall 104 is formed to be shorter than the bottom wall 102 and configured for placing the container 1. The second portion of the lower housing 10 includes a side wall 103b and a side wall 103c, the side wall 103b is connected to one end, away from the side wall 103a, of the top wall 104 and extends to the upper housing 20, the side wall 103c is connected to one end, away from the side wall 103a, of the bottom wall 102 and extends to the upper housing 20, and the side wall 103c and the side wall 103b are spaced apart from each other. Thus, the side wall 103c, the bottom wall 102, the side wall 103b, the side wall 103a and the top wall 104 are connected in this order to form a first receiving cavity RC1, and the first receiving cavity RC1 is opened from an upper end between the side wall 103b and the side wall 103c and is configured to movably install the upper housing 20.

The upper housing 20 is of an inverted L shape and includes a first portion arranged transversely and configured to be installed with a cutter 30, and a second portion arranged vertically and movably connected to the second portion of the lower housing 10. A portion of the lifting member 70 is installed within the second portion of the lower housing 10, and another portion of the lifting member 70 is accommodated in the second portion of the upper housing 20. In the present embodiment, the first portion of the upper housing 20 is internally provided with a support frame 201 installed with a driving structure 101 thereon. The first portion of the upper housing 20 includes a top wall 202 (i.e., upper end), a side wall 203a connected to one end of the top wall 202 and extending from the top wall 202 towards the lower housing 10, and a bottom wall 204 connected to one end of the side wall 203a away from the top wall 202 and arranged opposite the top wall 202. The bottom wall 204 faces the top wall 104 and is configured for connecting the cutter 30. The second portion of the upper housing 20 includes a side wall 203b and a side wall 203c, the side wall 203b is connected to one end of the bottom wall 204 away from the side wall 203a and extends to the lower housing 10, and the side wall 203c is connected to one end, away from the side wall 203a, of the top wall 202 and extends to the lower housing 10. The side wall 203c and the side wall 203b are spaced apart from each other. Thus, the side wall 203c, the top wall 202, the side wall 203b, the side wall 203a, and the bottom wall 204 are connected and form a second receiving cavity RC2, and the second receiving cavity RC2 is opened from an bottom end between the side wall 203b and the side wall 203c and is used to movably install on the upper housing 10. In the present embodiment, the second portion of the upper housing 20 is accommodated in the first receiving cavity RC1 of the lower housing 10, so that the first receiving cavity RC1 is in communication with the second receiving cavity RC2, and an receiving cavity RC formed by the lower housing 10 and the upper housing 20 is formed. When the upper housing 20 moves up and down relative to the lower housing 10, the side wall 203b and the side wall 203c are housed between the side wall 103b and the side wall 103c, the side wall 203b accesses the first receiving cavity RC1 in contact with the side wall 103b, the side wall 203c accesses the first receiving cavity RC1 in contact with the side wall 103c, and the distance between the bottom wall 204 of the upper housing 20 and the top wall 104 of the lower housing 10 changes.

The driving structure 101 is installed within the first portion of the upper housing 20 and includes a driving member 40, a first transmission member 50 and a second transmission member 60. Referring to FIG. 2 and FIG. 3, the driving member 40 is preferably a brushless direct current motor with such advantages as long service life and stable output and can stably drive the first transmission member 50 and the second transmission member 60, therefore, the cutter 30 rotates and moves up and down at a uniform speed, respectively. But not limited hereto, the driving member 40 can also be a brushed direct current motor. The driving member 40, the first transmission member 50 and the second transmission member 60 are installed in the first portion of the upper housing 20. Specifically speaking, the driving member 40 is fixedly installed in the first portion of the upper housing 20. The first transmission member 50 and the second transmission member 60 are rotatably installed in the first portion of the upper housing 20, respectively, and are connected to one output shaft 410 of the driving member 40, such that the driving member 40 outputs kinetic energy generated based on electrical energy to the first transmission member 50 and the second transmission member 60 through one output shaft 410.

Therefore, in a control method in which an ice cream maker 100 is driven by a brushed direct current motor, the ice cream maker 100 can drive the upper housing 20 to move at a uniform speed within a specified time in a downward churning stroke and a upward mixing stroke, respectively.

The input end 51a of the first transmission member 50 (the gearbox 51) is connected to the output shaft 410 of the driving member 40, and the second output end 53b of the first transmission member 50 is connected to the lifting member 70 and transmits kinetic energy, to output power to the lifting member 70 through the second output end 53b by changing the rotation speed. One end of the lifting member 70 is connected to the first transmission member 50, and another end of the lifting member 70 is connected to the second portion of the lower housing 10, therefore, under the driving of the driving member 40, the lifting member 70 is driven by the first transmission member 50, such that the lifting member 70 drives the upper housing 20 to move up and down relative to the lower housing 10.

Referring to FIG. 2 and FIG. 3, the second transmission member 60 is connected to one output shaft 410 of the driving member 40, and is detachably connected to the cutter 30, therefore, under the driving of the driving member 40, the cutter 30 is driven to rotate by the second transmission member 60.

The second transmission member 60 is provided with at least two gears, one of the gears is connected to the driving member 40, and one gear among the rear-stage gears is detachably connected to the cutter 30, such that the second transmission member 60 transmits rotation of the driving member 40 to the cutter 30, and the cutter 30 is enabled to rotate.

Referring to FIG. 2 to FIG. 13, specific composition of the driving structure 101 is illustrated. The driving member 40 is installed in the first portion of the upper housing 20 and connected to the first transmission member 50 and the second transmission member 60, respectively. In the embodiment of the present disclosure, the first transmission member 50 and the second transmission member 60 share one output shaft 410 of the driving member 40, that is, the driving member 40 is a single-axis motor, thereby reducing costs of the ice cream maker 100. In the present embodiment, the output shaft 410 can be for example a gear shaft with teeth or gears (not shown in the figures) at one end, and the output shaft 410 is configured downwards along an up-and-down direction. The first transmission member 50 and the second transmission member 60 are connected to different parts of the output shaft 410, respectively, that is, in an axial direction of the output shaft 410, the second transmission member 60 is arranged above the first transmission member 50. The driving member 40 can simultaneously drive the first transmission member 50 and the second transmission member 60, such that the upper housing 20 can move up and down, and meanwhile the cutter 30 can rotate clockwise or anticlockwise. Since the driving member 40 is arranged in the upper housing 20, circuit connection members associated with the driving member 40 can be arranged in the upper housing 20, therefore, even when the upper housing 20 moves, these circuit connection members remain stationary relative to the upper housing 20, thereby inhibiting risks of damage to wiring, instable plugging and unplugging of connectors, etc.

The first transmission member 50 is provided with a gearbox 51 engaged with the second portion 412 of the output shaft 410 of the driving member 40 and an anti-skidding member 53 configured to output the speed-changed power. The anti-skidding member 53 is installed in the gearbox 51 and connected to the lifting member 70.

The gearbox 51 can be a planet gearbox as an example. In an example of the present embodiment, referring to FIG. 8 to FIG. 11, the gearbox 51 includes two planet carriers 540, a plurality of planet gears 550 rotatably connected between the two planet carriers 540, and a first gear ring 560 and a second gear ring 570 engaged on the outer surfaces of the plurality of planet gears 550. Two ends of rotation shafts of the plurality of planet gears 550 are connected to the two planet carriers 540, respectively, such that the plurality of planet gears 550 can be rotatably connected between the two planet carriers 540. The planet carrier 540, close to the side of the driving member 40, among the two planet carriers 540 allows the output shaft 410 to pass through and engage with the plurality of planet gears 550. The plurality of planet gears 550 are arranged in a circle around the output shaft 410 and are engaged with each other, at the same time, the surface of the inner side surrounded by the plurality of planet gears 550 serves as the input end 51a of the gearbox 51 and is engaged with the output shaft 410 of the driving member 40. The first gear ring 560 and the second gear ring 570 are gear rings having teeth on the inner circumferential surface, and the first gear ring 560 is installed within the upper housing 20, and rotation of the first gear ring 560 is restricted and the plurality of planet gears 550 are driven to auto-rotate when the output shaft 410 rotates, moreover, when the plurality of planet gears 550 auto-rotate around their respective central axes (not shown in the figures), the plurality of planet gears 550 rotate relative to the first gear ring 560 fixed on the upper housing 20, i.e., the plurality of planet gears 550 perform revolution around the output shaft 410, and further drive the second gear ring 570 to rotate around the output shaft 410. The second gear ring 570 forms an accommodating groove 510, the inner circumferential surface of the second gear ring 570 has teeth, and the plurality of planet gears 550 are accommodated in the accommodating groove 510 in a manner that the plurality of planet gears 550 are sandwiched between the two planet carriers 540, such that teeth on the outer circumferential surfaces of the plurality of planet gears 550 are engaged with teeth on the inner circumferential surface of the second gear ring 570. An output part 572 protrudes from the side of the second gear ring 570 away from the first gear ring 560. Moreover, the output part 572 extends towards the side away from the driving member 40 (the lower side) and functions as an output end 51b of the first transmission member 50. The output part 572 is formed with an installation groove 572a which is recessed on the side of the output part 572 away from the first gear ring 560, and the installation groove 572a is configured to install the anti-skidding member 53. The installation groove 572a is for example sheathed with the anti-skidding member 53. The anti-skidding member 53 rotates synchronously with the second gear ring 570 when the second gear ring 570 rotates. An inner circumferential surface of the installation groove 572a is formed with at least one first matching part 572C having a concave-convex surface.

Further, in the above embodiment, through changing the number of planet gears 550, the number of teeth and size of each gear, it is possible to realize different rotation speeds of the second gear ring 570. It can be understood that the gearbox 51 of the present disclosure is not limited to the above example of a planet gearbox, and any gearbox with coaxial input and output can be used. In addition, the gearbox 51 is not limited to a planet gearbox including a first-stage planet gear 550 and a first-stage second gear ring 570 as described above, but at least one of the planet gear 550 and the second gear ring 570 can be provided in a plurality of stages as long as the output shaft 410 is connected to a plurality of the planet gears 550 of the first stage, and the anti-skidding member 53 is connected to the second gear ring 570 of the last stage.

Figure 12:
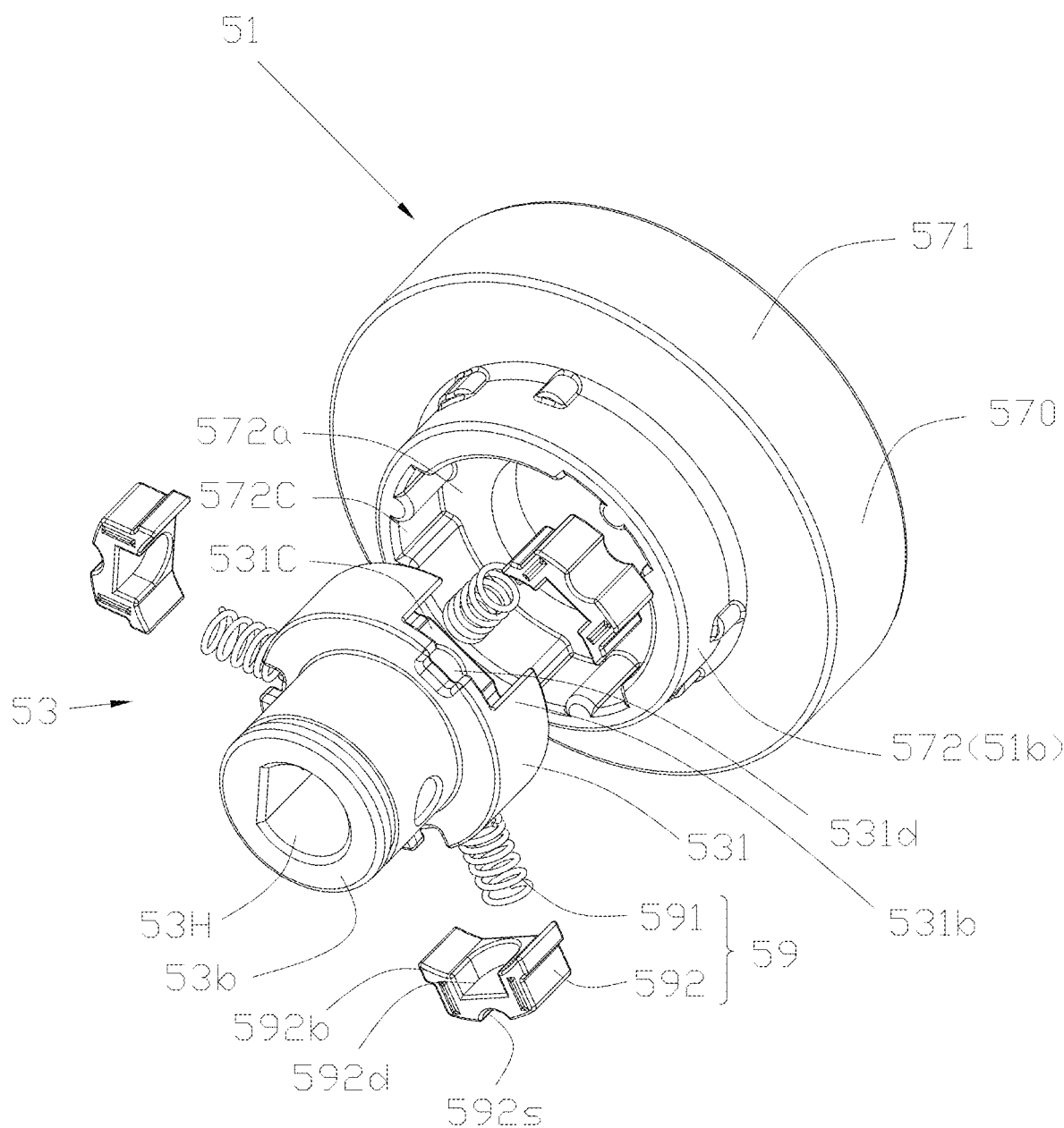
FIG. 12 is an exploded view of the first transmission member of the ice cream maker shown in FIG. 8 from another angle.
Figure 13:
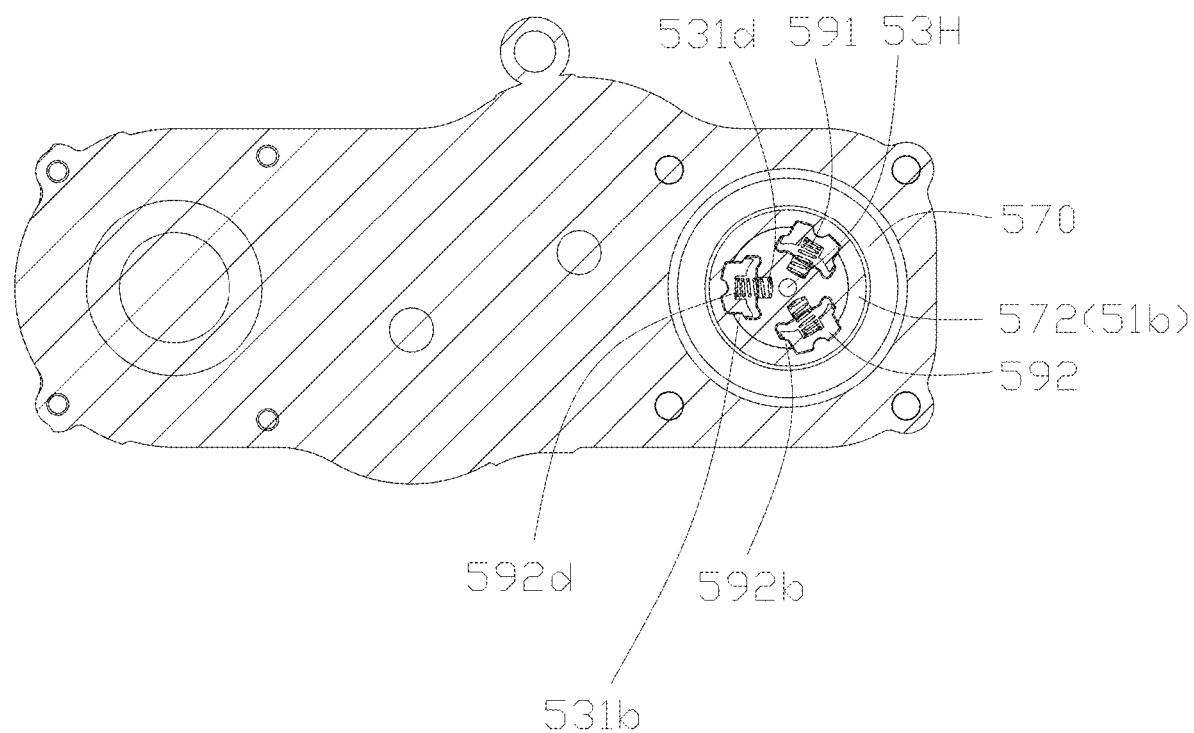
FIG. 13 is a partially exploded view of the first transmission member of the ice cream maker shown in FIG. 8.
Figure 14:
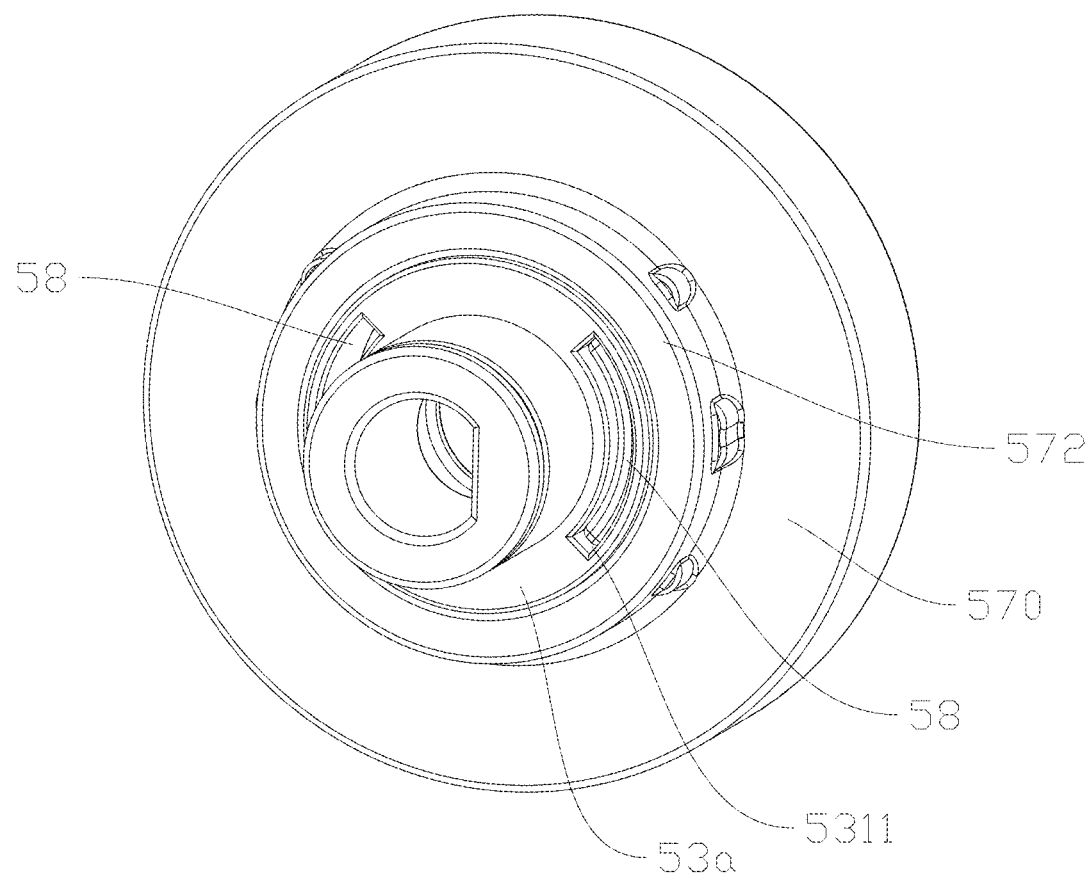
FIG. 14 is a diagram of the first transmission member of the ice cream maker of another embodiment.
Figure 15:
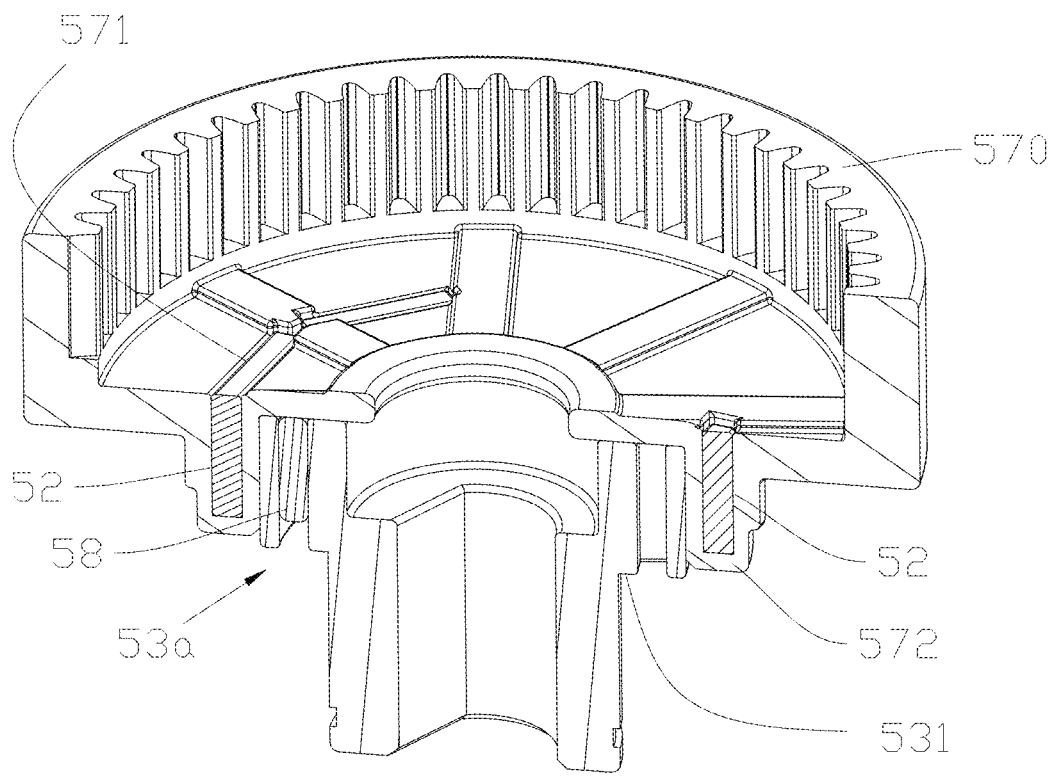
FIG. 15 is an exploded view of the first transmission member shown in FIG. 14.
Figure 16:
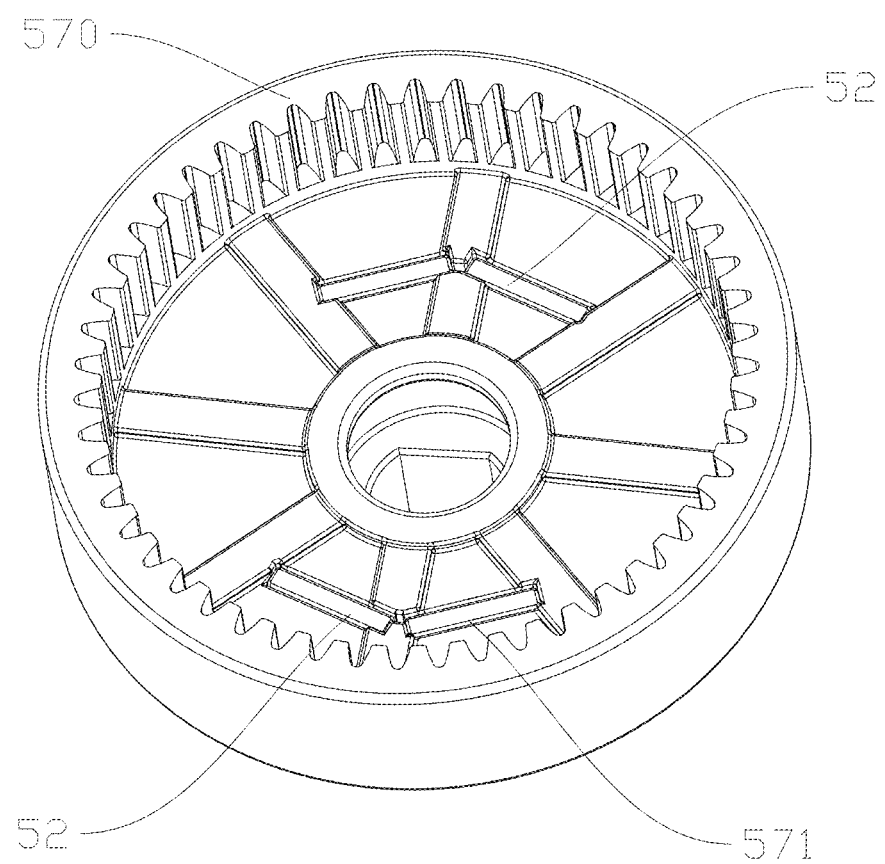
FIG. 16 is a perspective view of the first transmission member shown in FIG. 14 from another angle.

Referring to FIG. 12 to FIG. 13, the anti-skidding member 53 includes a sleeve-connected portion 531 and at least one clamping member 59 movably installed on the sleeve-connected portion 531. The sleeve-connected portion 531 is accommodated in the installation groove 572a and connected to the first threaded transmission piece 710 of the lifting member 70. The positions and number of the clamping members 59 correspond to those of the first matching parts 572C. The sleeve-connected portion 531 extends towards a side (the lower side) away from the output part 572 and is formed as a second output end 53b of the first transmission member 50. A connecting hole 53H is formed through the sleeve-connected portion 531 along the up-and-down direction. The connecting hole 53H allows fixed connection of the first threaded transmission piece 710 of the lifting member 70, such that the sleeve-connected portion 531 of the anti-skidding member 53 is fixedly connected to the lifting member 70. An outer circumferential surface of the sleeve-connected portion 531 is in clamping connection with the inner circumferential surface of the installation groove 572a of the output part 572. The sleeve-connected portion 531 includes at least one clamping groove 531C which is recessed towards a central axis of the anti-skidding member 53 on the outer circumferential surface. The positions and number of the clamping grooves 531C correspond to those of the first matching part 572C. A bottom surface of the clamping groove 531C is formed with a first locating groove 531d which is further recessed towards the central axis. The outer circumferential surface of the sleeve-connected portion 531 includes two clamping walls 531b covering two circumferential sides of each clamping groove 531C when the clamping groove 531C is overlooked, such that in each clamping groove 531C, the two clamping walls 531b extend towards each other.

The outer circumferential surface of the sleeve-connected portion 531 is connected to a retractable clamping member 59. The clamping member 59 includes an elastic piece 591 such as a spring and a clamping piece 592 and is clamped together with the sleeve-connected portion 531 in an installation groove 572a of the output part 572. One end of the elastic piece 591 is connected to the sleeve-connected portion 531, and another end of the elastic piece 591 is connected to the clamping piece 592, such that the elastic piece 591 is sandwiched between the sleeve-connected portion 531 and the clamping piece 592, and the clamping piece 592 can be movably arranged in the clamping groove 531C relative to the sleeve-connected portion 531. One end of the clamping piece 592 is connected to the elastic piece 591, and another end of the clamping piece 592 protrudes from the sleeve-connected portion 531 and abuts against the inner circumferential surface of the output part 572. The clamping piece 592 is formed with a second locating groove 592d which is recessed in a direction away from the elastic piece 591 on a surface of the side to which the elastic piece 591 is connected. The clamping piece 592 has a concave-convex second matching part 592s matching with the concavity of the first matching part 572C on a surface of the side of the clamping piece 592 away from the elastic piece 591. One end of the elastic piece 591 is positioned in the first locating groove 531d, and another end of the elastic piece 591 is positioned in the second locating groove 592d, such that the elastic piece 591 is sandwiched between the sleeve-connected portion 531 and the clamping piece 592. Moreover, the clamping piece 592 has two side wings 592b on both sides of the circumferential direction of the anti-skidding member 53. When the two side wings 592b are accommodated in the clamping groove 531C, the two side wings 592b are configured closer to the central axis of the anti-skidding member 53 than the two clamping walls 531b, such that the two clamping walls 531b abut against the two side wings 592b, respectively, the clamping piece 592 is movably installed within the sleeve-connected portion 531, and the elastic piece 591 pushes the clamping piece 592 towards the outside of the sleeve-connected portion 531, then a portion of the clamping piece 592 protrudes from the sleeve-connected portion 531 so as to abut against a first matching part 572C corresponding to the clamping groove 531C. The clamping groove 531C is thick enough to completely accommodate the clamping member 59 when the clamping member 59 is compressed inwards, i.e., the clamping member 59 does not protrude from the outer circumferential surface of the sleeve-connected portion 531. In addition, the shapes of the clamping walls 531b and the side wings 592b are not limited to the examples illustrated above, and can be set arbitrarily, as long as the clamping member 59 can be clamped into the clamping groove 531C.

Moreover, through setting the first locating groove 531d and the second locating groove 592d, the elastic piece 591 can be easily installed and positioned, to prevent displacement of the elastic piece 591 between the sleeve-connected portion 531 and the clamping piece 592. Moreover, even when the clamping member 59 is subjected to an uneven force, the elastic piece 591 is not easily displaced and loosened from between the sleeve-connected portion 531 and the clamping piece 592.

In addition, the number of the clamping members 59, the first matching parts 572C and the clamping grooves 531C shown in FIG. 12 and FIG. 13 is three, which is not limited hereto, and the number can also be one or two, etc., preferably, when more than two clamping members 59, first matching parts 572C and clamping grooves 531C are arranged, more than two clamping members 59 are uniformly arranged along a circumferential direction of the anti-skidding member 53, thereby inhibiting uneven force subjected onto the anti-skidding member 53 during rotation, and inhibiting shaking of the first threaded transmission piece 710 of the lifting member 70.

Referring to FIG. 2 to FIG. 5, the lifting member 70 includes a first threaded transmission piece 710 and a second threaded transmission piece 720. One end of the first threaded transmission piece 710 is fixedly connected to the sleeve-connected portion 531 of the anti-skidding member 53 in the connecting hole 53H by means of a fastener (not shown in the figure), with threads formed partially or completely on the outer circumferential surface exposed from the connecting hole 53H, and the end of the first threaded transmission piece 710 is in threaded connection with the threaded holes 720H of the second threaded transmission piece 720. The second threaded transmission piece 720 is fixedly arranged in the lower housing 10, and threaded holes (not shown in the figure) are formed through the second threaded transmission piece 720. Another end of the first threaded transmission piece 710 extends towards the side (below) of the lower housing 10 and penetrates through the threaded hole in the second threaded transmission piece 720 arranged in the lower housing 10. Since the second threaded transmission piece 720 is stationary, when the first threaded transmission piece 710 rotates, the anti-skidding member 53 moves close to or away from the second threaded transmission piece 720 (that is, moving up and down) through threads. Further, the first threaded transmission piece 710 is a screw and the second threaded transmission piece 720 is a screw nut.

In addition, the central axes of the output shaft 410, the planet carrier 540, the first gear ring 560, the second gear ring 570, the anti-skidding member 53, the first threaded transmission piece 710, and the second threaded transmission piece 720 described above are coaxial. As a result, the driving member 40 can synchronously drive the first transmission member 50 and the first threaded transmission piece 710 to move up and down, such that the upper housing 20 is synchronously expanded and retracted relative to the lower housing.

Further, the lifting member 70 can further include a first guide rod 730 and a second guide rod 740 sheathed with the first guide rod 730. One end of the first guide rod 730 is accommodated in the upper housing 20 and fixedly connected to the support frame 201 inside the upper housing 20. In some embodiments, the first guide rod 730 can also be installed at other parts which are integrally formed with the upper housing 20, the first gear ring 560 and the following gear carrier 600 of the second transmission member 60. Rotation of the first guide rod 730 is limited to synchronous up and down movement along with the upper housing 20, another end of the first guide rod 730 extends towards the lower housing 10, and one end of the second guide rod 740 is fixedly connected to the lower housing 10, such that the second guide rod 740 is stationary, and another end of the second guide rod 740 extends towards the upper housing 20. The wall surface of the first guide rod 730 is overlapped with and in sliding contact with the wall surface of the second guide rod 740. The first guide rod 730 and the second guide rod 740 are hollow straight barrel rods. The first threaded transmission piece 710 is accommodated in the first guide rod 730 and movably sheathed in the second threaded transmission piece 720. The second threaded transmission piece 720 is fixedly installed on the top of the second guide rod 740. The hollow interiors of the first guide rod 730 and the second guide rod 740 allow movement of the first threaded transmission piece 710, and do not contact with the first threaded transmission piece 710. The first guide rod 730 moves up and down synchronously along with the upper housing 20, the first transmission member 50 and the first threaded transmission piece 710, and the first threaded transmission piece 710 is less prone to position offset and moves up and down stably during up and down movement.

The first guide rod 730 and the second guide rod 740 can be cylinders. In addition, the first guide rod 730 and the second guide rod 740 can also be elliptical cylinders, or polygonal cylinders with a triangular, quadrilateral or trapezoid cross section, thereby inhibiting radial or circumferential twisting during up and down movement of the first guide rod 730 and ensuring stable up and down movement of the first threaded transmission piece 710. Further, the first guide rod 730 and the second guide rod 740 can also be in contact with each other with a wall surface including one of ribs, bumps or recesses and slots.

Figure 7:
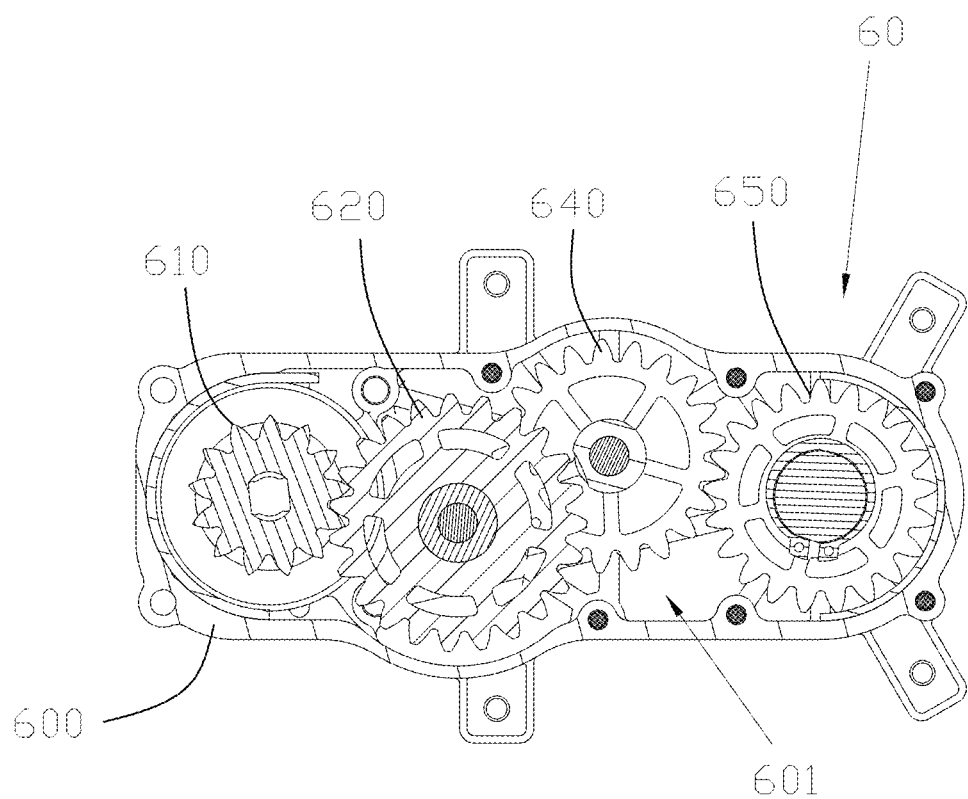
FIG. 7 is a sectional view of the second transmission member of the ice cream maker shown in FIG. 1 when viewed from an opposite side.
Figure 8:
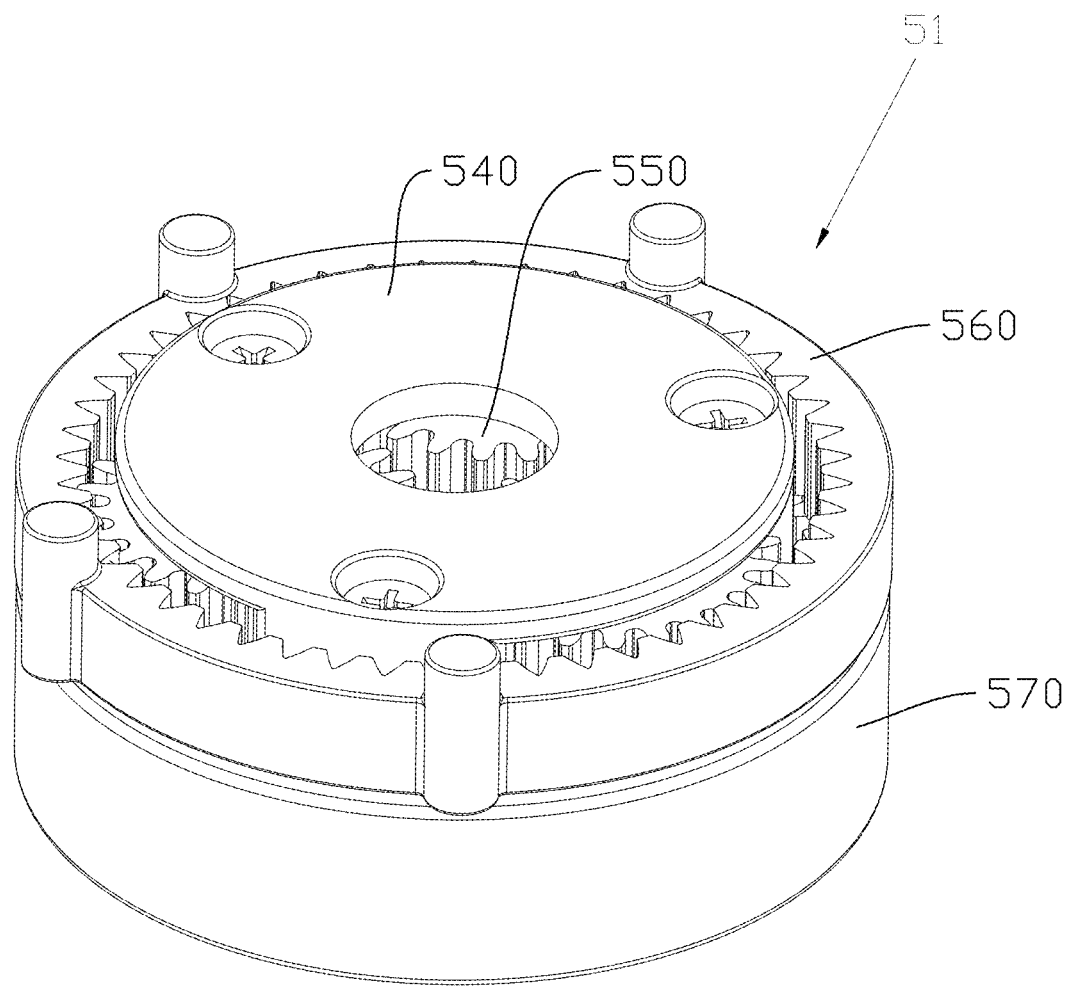
FIG. 8 is a diagram illustrating the first transmission member of the ice cream maker shown in FIG. 1.
Figure 9:
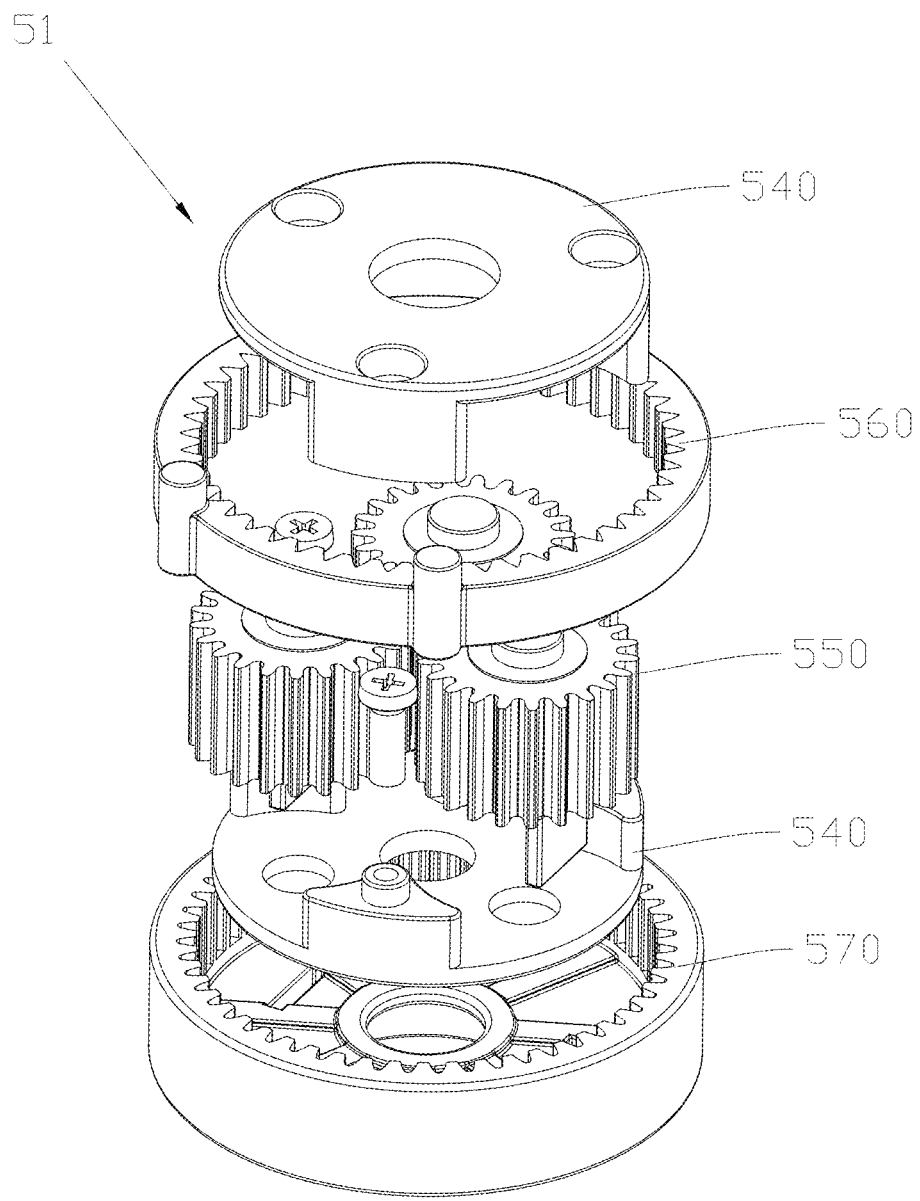
FIG. 9 is an exploded view of the first transmission member shown in FIG. 8.
Figure 10:
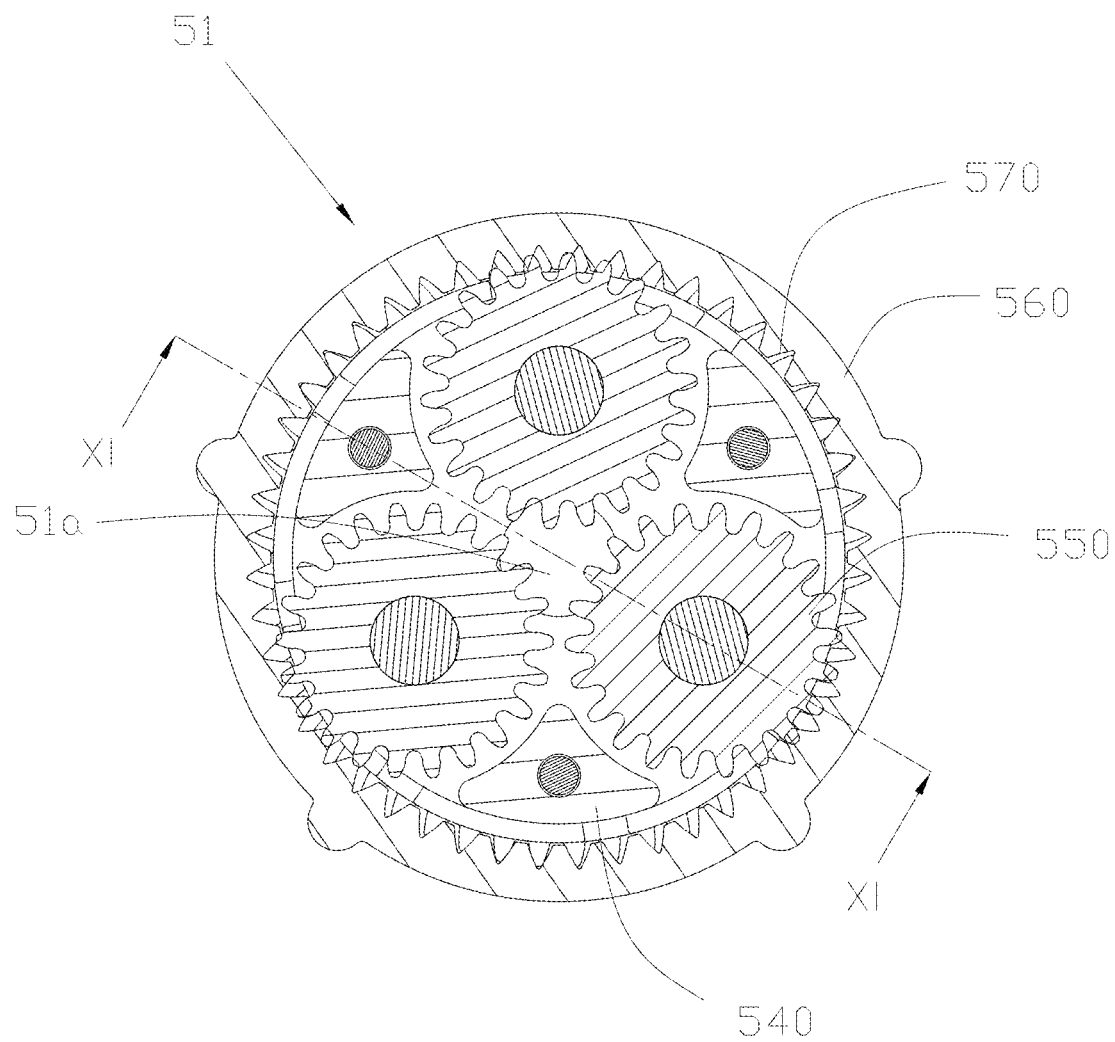
FIG. 10 is a perspective view of the first transmission member of the ice cream maker shown in FIG. 8 from another angle.
Figure 11:
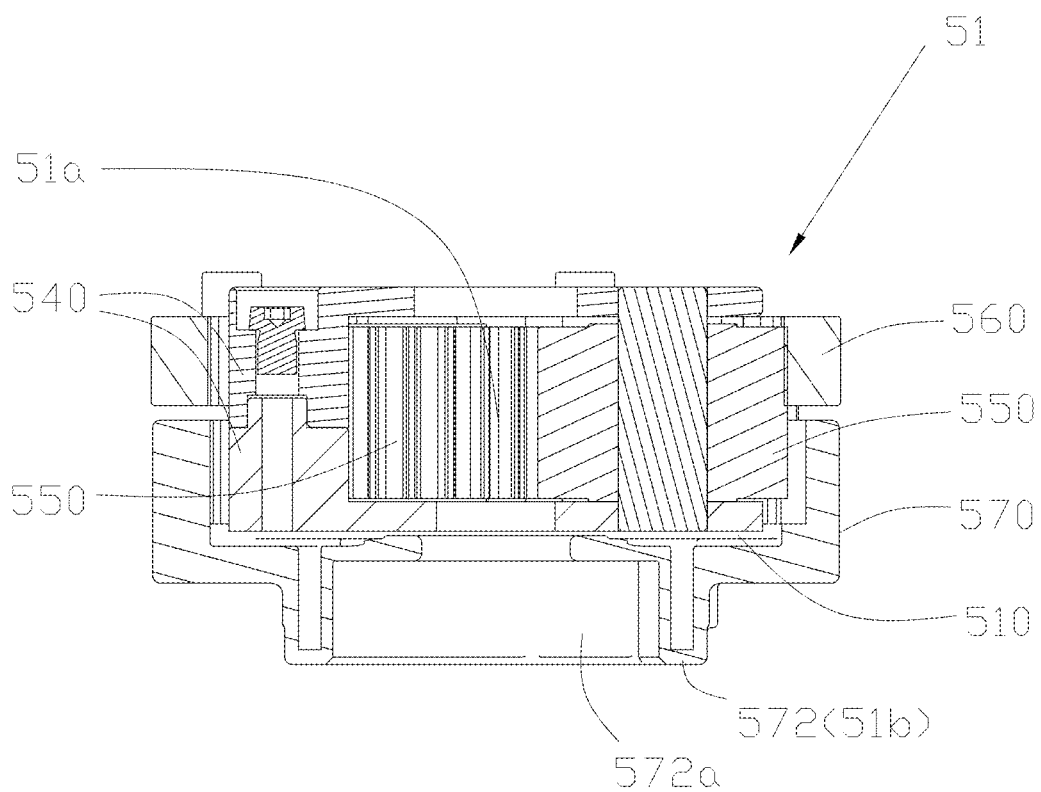
FIG. 11 is a diagram of the XI-XI line of the first transmission member of the ice cream maker shown in FIG. 10.

FIG. 7 shows an example of a second transmission member 60. The second transmission member 60 is connected to the cutter 30 and transmits kinetic energy. The second transmission member 60 includes a plurality of gears 601 and a gear carrier 600, and the plurality of gears 601 can be for example a first gear 610, a second gear 620, a third gear 630, a fourth gear 640, and a fifth gear 650 connected in sequence. The rotation shaft of each of the plurality of gears 601 is supported on the gear carrier 600, such that the plurality of gears 601 are rotatably connected to the gear carrier 600. Moreover, the first gear 610 is connected to the first portion 411 of the output shaft 410 of the driving member 40, and the fifth gear 650 of the last stage is clamped with the transmission output member 660, such that the transmission output member 660 rotates synchronously with the fifth gear 650. A groove or hole 670 communicated with the outside of the upper housing 20 is formed through the transmission output member 660 for clamping connection with one end of the cutter 30, such that the cutter 30 rotates synchronously with the transmission output member 660 and the fifth gear 650. In examples of the present embodiment, the second transmission member 60 includes a plurality of gears connected in sequence, but is not limited hereto, and a belt or a connecting rod may be adopted for connection between two gears. It can be understood that the second transmission member 60 can use existing compositions.

Referring to FIG. 1 to FIG. 3, the cutter 30 is provided with a cutter shaft 31 and a cutter head 32, wherein one end of the cutter shaft 31 is connected to a groove or hole 670 on the upper housing 20, and the other end, that is, the end away from the upper housing 20, is connected to the cutter head 32. During use, the cutter head 32 is accommodated inside the container 1. The driving structure 101 can drive the upper housing 20 to move, such that the upper housing 20 can expand and retract (move up and down) relative to the lower housing 10 and drive the cutter head 32 to move up and down relative to the lower housing 10 and the container 1.

Specific composition of the cutter 30 of the present disclosure will be illustrated below referring to FIG. 19 to FIG. 25.

The cutter shaft 31 of the cutter 30 includes an member 310 with a hollow space and an inner cutter shaft 320. An inner cutter shaft 320 is sheathed in the hollow space of the cutter member 310 and rotatably connected to the inside the outer member 310 through a bearing 330, the bearing 330 allows rotatable connection of the inner cutter shaft 320 relative to the member 310, and fixes upper and lower positions of the bearing 330 and the member 310 relative to each other. Two ends of the inner cutter shaft 320 extend longer than two ends of the member 310, that is, one end of the inner cutter shaft 320 close to the cutter head 32 and another end of the inner cutter shaft 320 away from the cutter head 32 are exposed from the outer member 310. Moreover, the end of the inner cutter shaft 320 close to the cutter head 32 is integrally formed with the cutter head 32, and the cutter head 32 rotates synchronously with the inner cutter shaft 320. In addition, a connector 350 engaged with the groove or hole 670 of the second transmission member 60 is formed at the end on the side, away from the cutter head 32, of the inner cutter shaft 320. When the cutter 30 is installed in the groove or hole 670 of the second transmission member 60, one end of the outer member 310 is clamped into the inner wall of the upper housing 20, and the connector 350 on the end of the inner cutter shaft 320 on the same side is detachably inserted into the groove or hole 670, therefore, the inner cutter shaft 320 is engaged with the transmission output member 660 and rotates synchronously with the fifth gear 650. As a result, the outer member 310 is clamped to the inner wall of the upper housing 20, when the inner cutter shaft 320 is rotatably connected relative to the upper housing 20, the inner cutter shaft 320 rotates inside the outer member 310 while the outer member 310 does not rotate. During rotation and up and down movement of the cutter 30, the outer member 310 protects the user from being damaged by the rotating inner cutter shaft 320 in a way of not interfering with rotation of the inner cutter shaft 320. The outer member 310 can be made of plastic, rubber, silicone and other materials having a certain degree of hardness, but preferably, the outer member 310 is made of metal.

In addition, a shaft sleeve 340 is arranged on an outer circumferential surface of the end of the outer member 310 away from the cutter head 32, and a first flange 341 and a second flange 342 protrude from the shaft sleeve 340 in a direction away from the central axis of the cutter 30. Compared with the second flange 342, the first flange 341 is more protruding and is closer to the side of the cutter head 32. The gap separating the first flange 341 from the second flange 342 is formed as a slot 343. The first flange 341, the second flange 342 and the slot 343 are preferably formed around the entire circumference of the circumferential direction of the outer member 310, thereby facilitating installation on the upper housing 20 in a blind-alignment manner.

Figure 18:
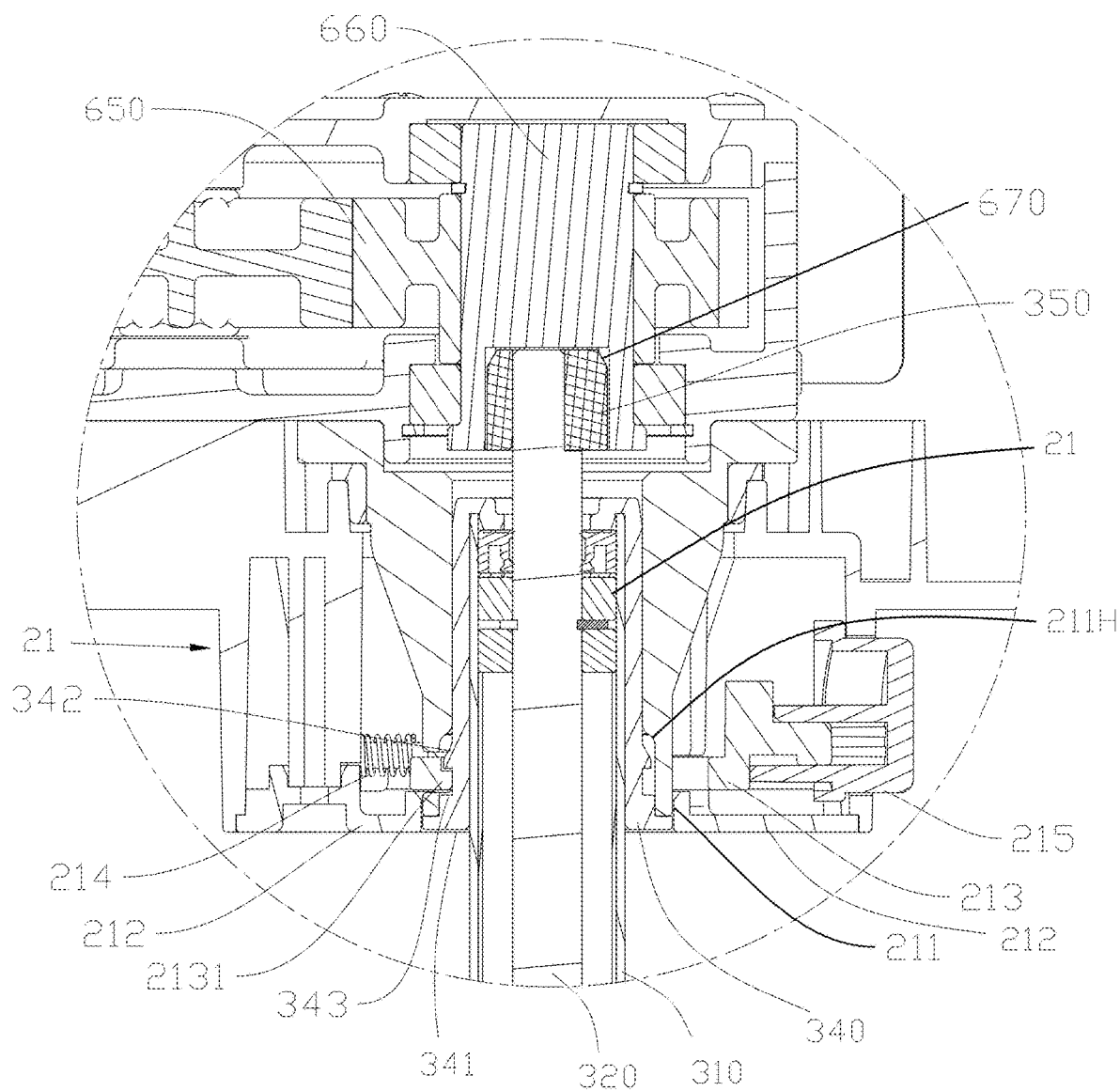
FIG. 18 is an enlarged view showing an A-part of FIG. 2.
Figure 19:
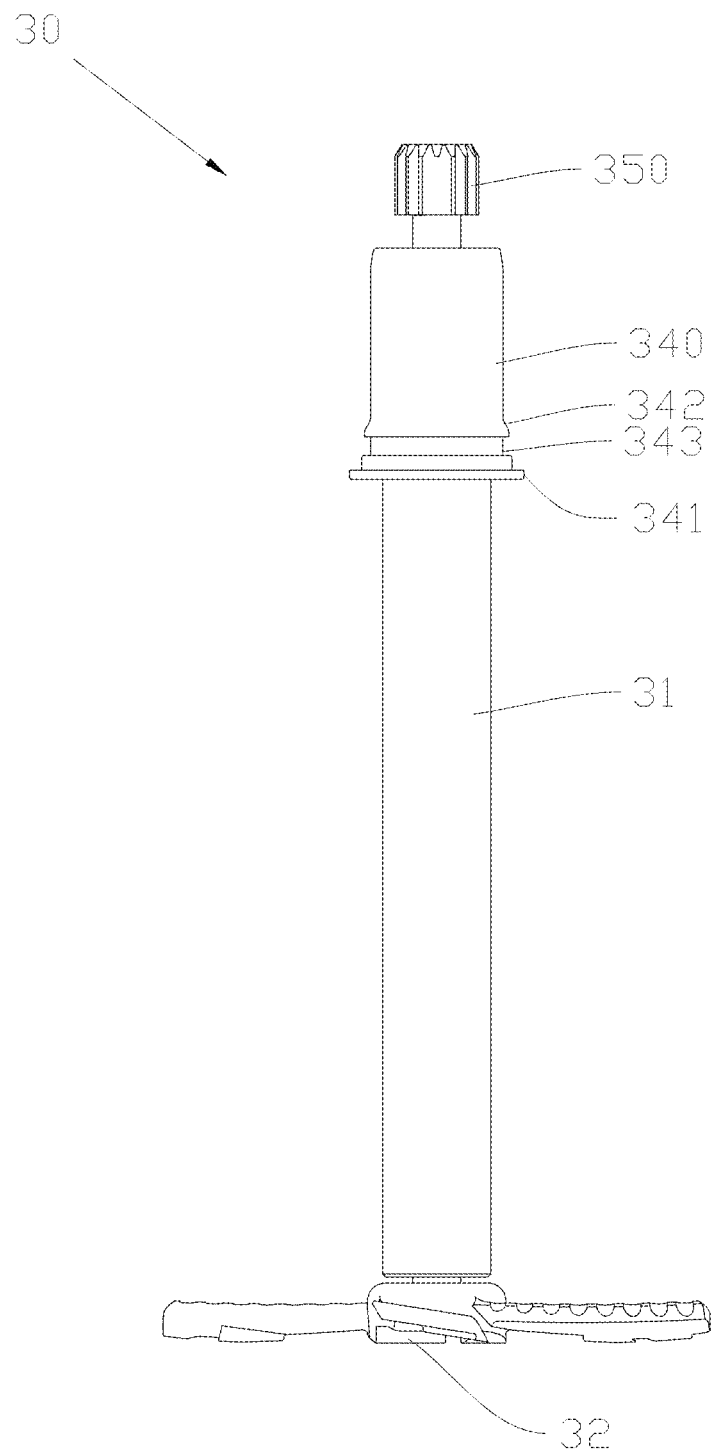
FIG. 19 is a perspective view of the cutter of the ice cream maker shown in FIG. 1.
Figure 20:
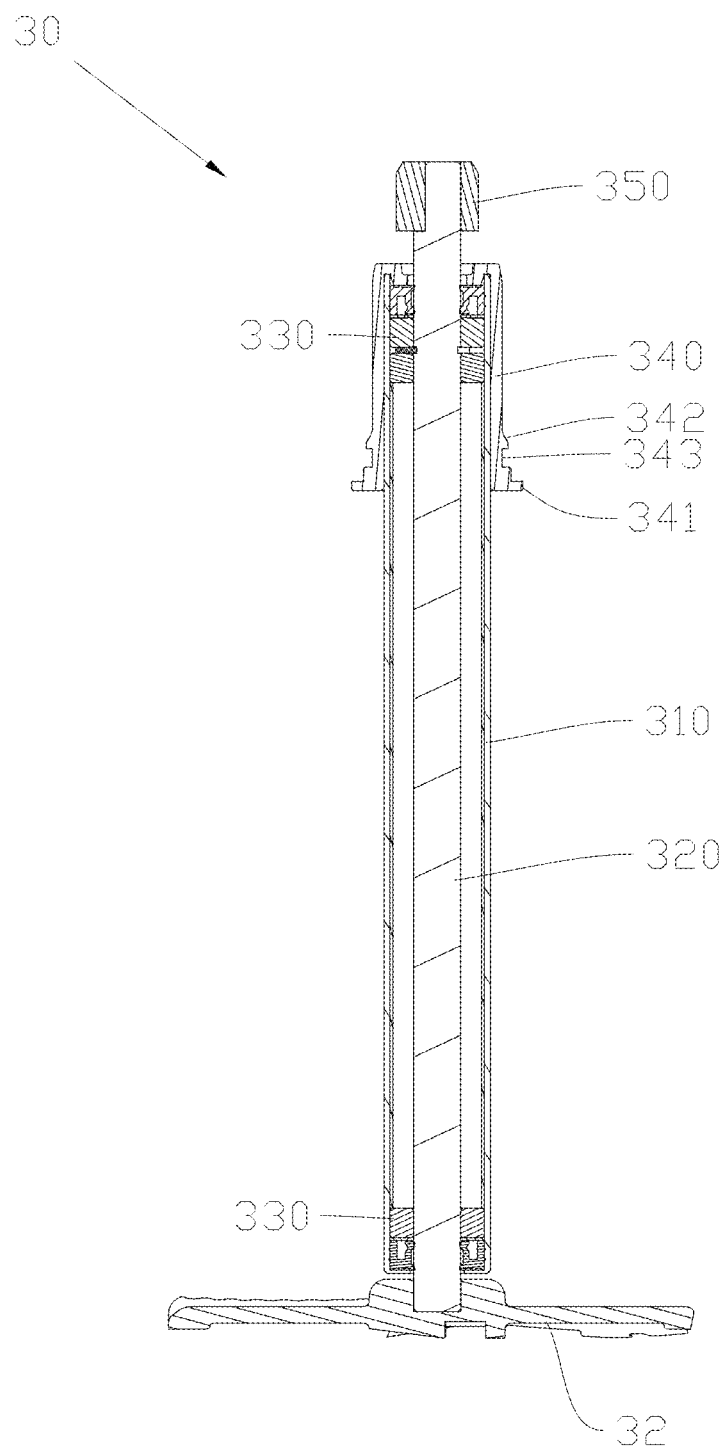
FIG. 20 is a cross-sectional view of the cutter shown in FIG. 19.
Figure 21:
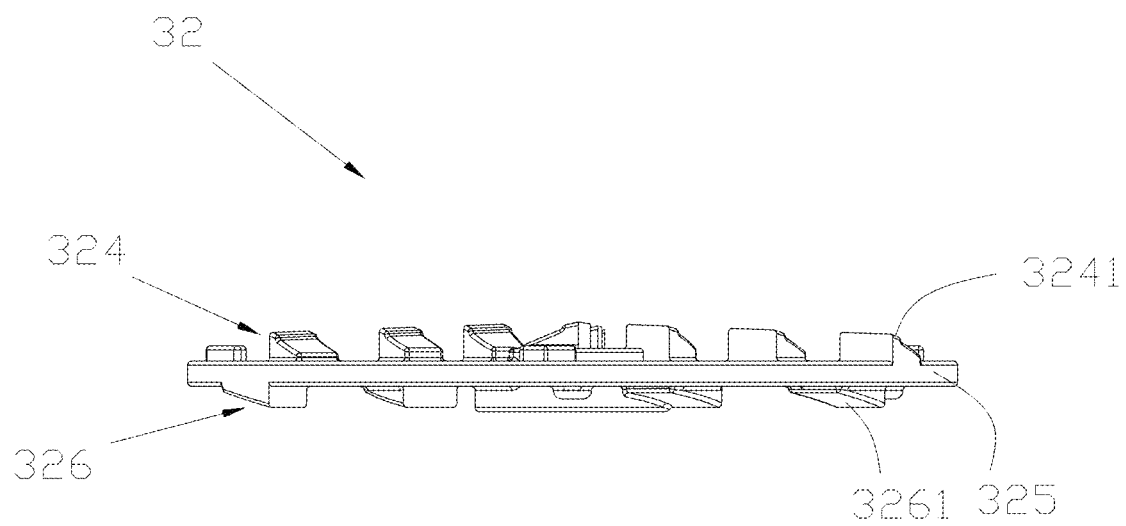
FIG. 21 is a cross-sectional view of the cutting head of the cutter shown in FIG. 19.
Figure 22:
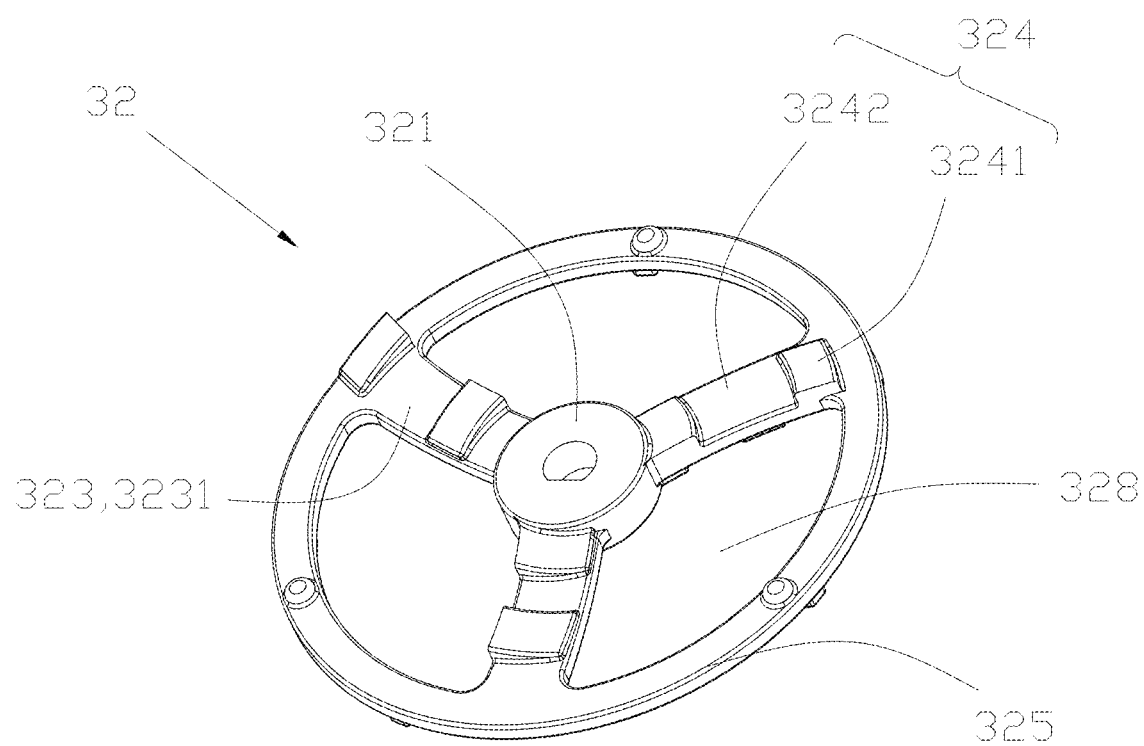
FIG. 22 is a perspective view of the cutting head of the cutter shown in FIG. 19.
Figure 23:
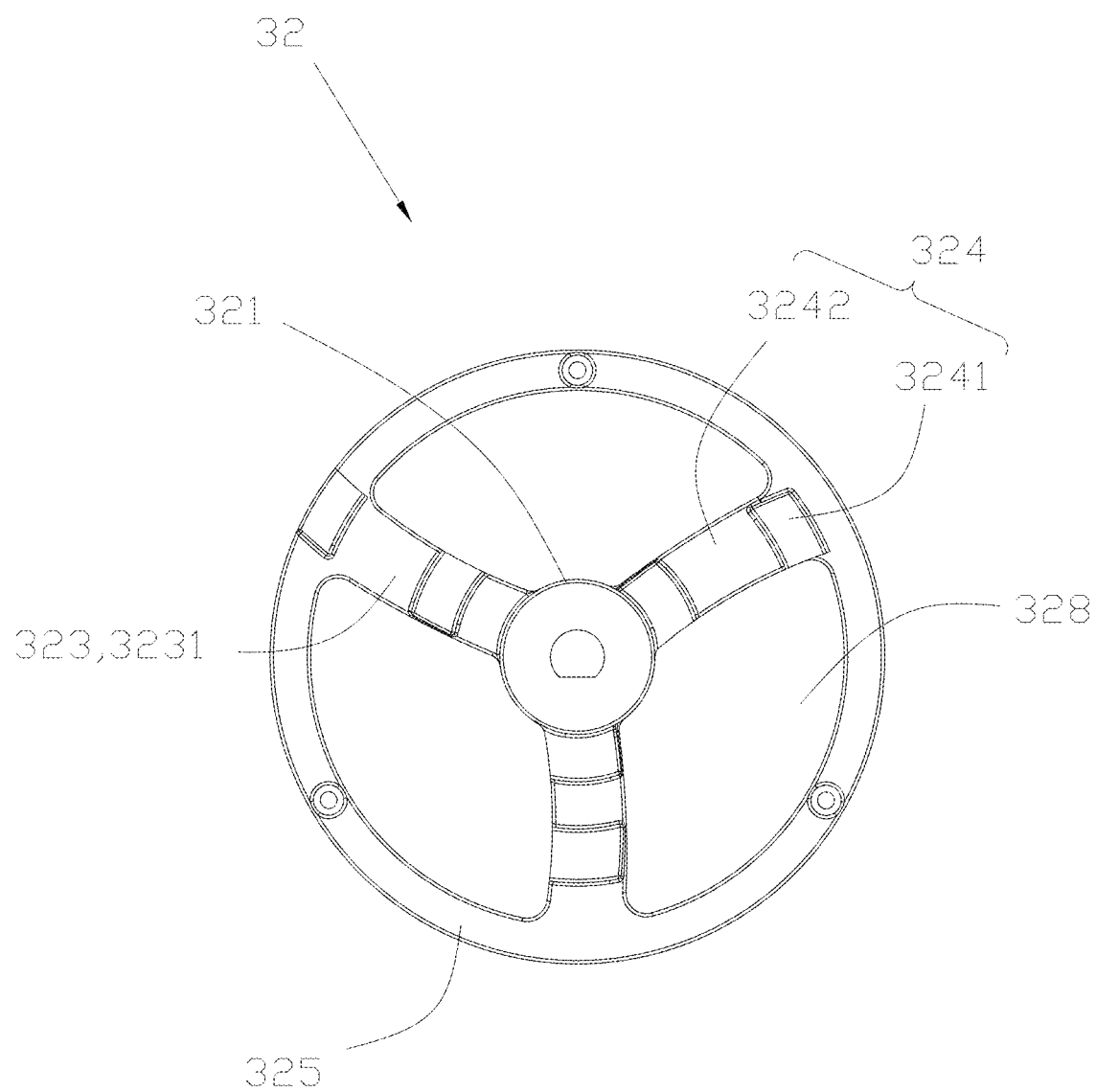
FIG. 23 is a top view of the cutting head of the cutter shown in FIG. 22.
Figure 24:
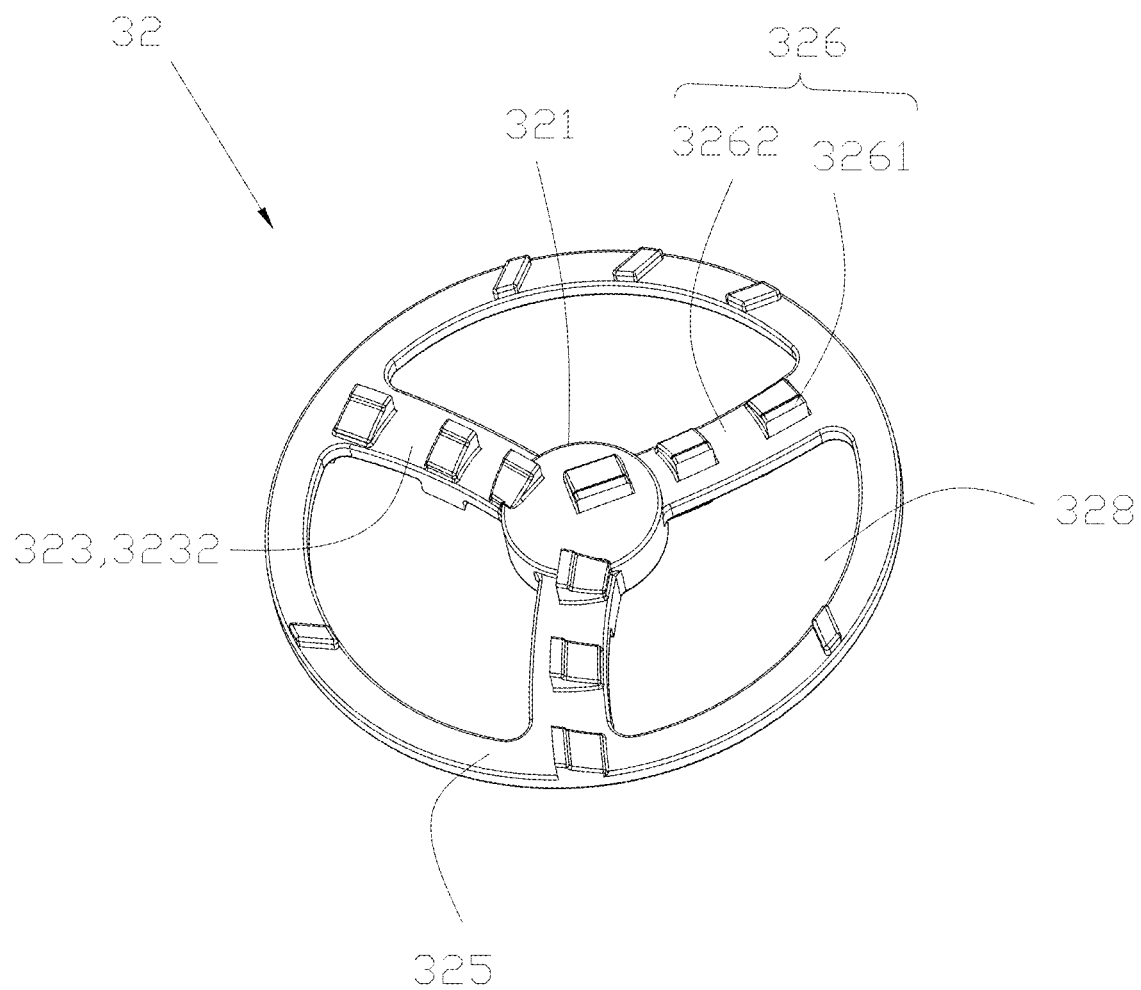
FIG. 24 is a perspective view of the cutting head of the cutter shown in FIG. 22 from another angle.
Figure 25:
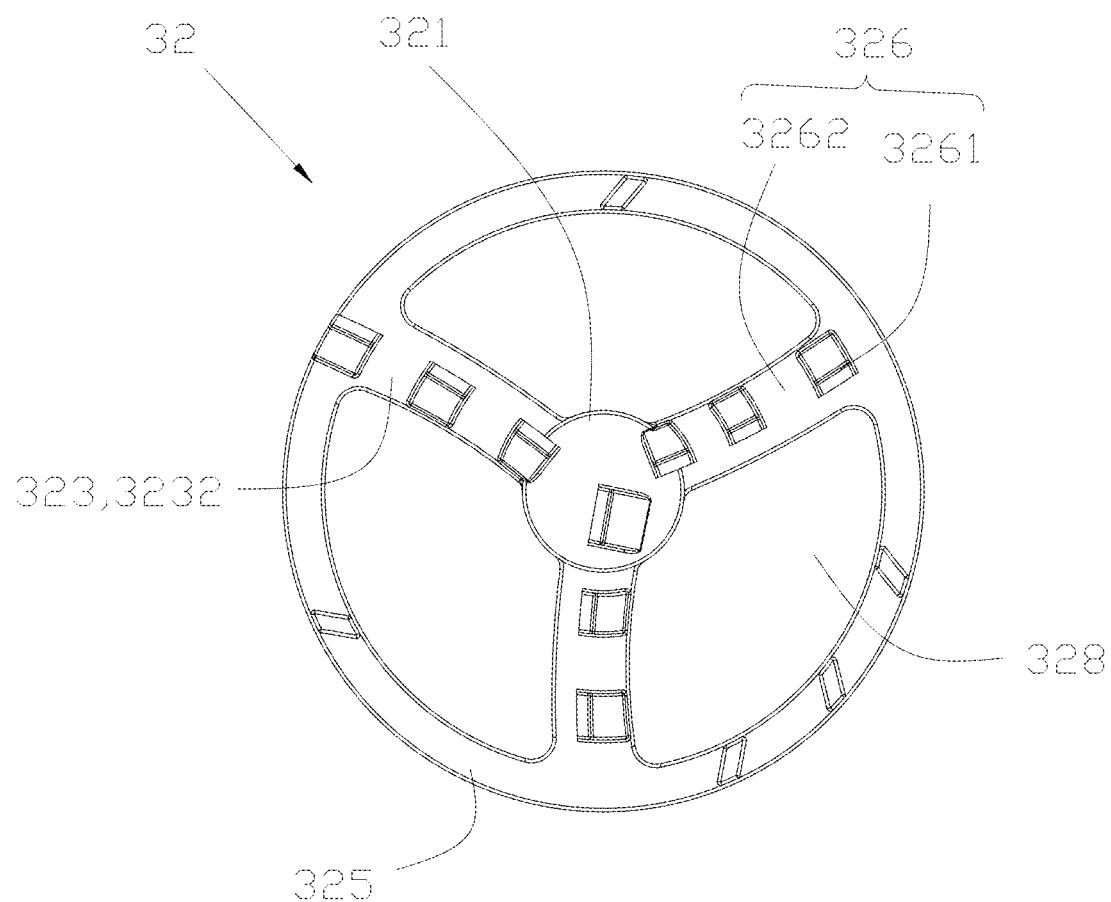
FIG. 25 is a bottom view of the cutting head of the cutter shown in FIG. 22.
Figure 26:
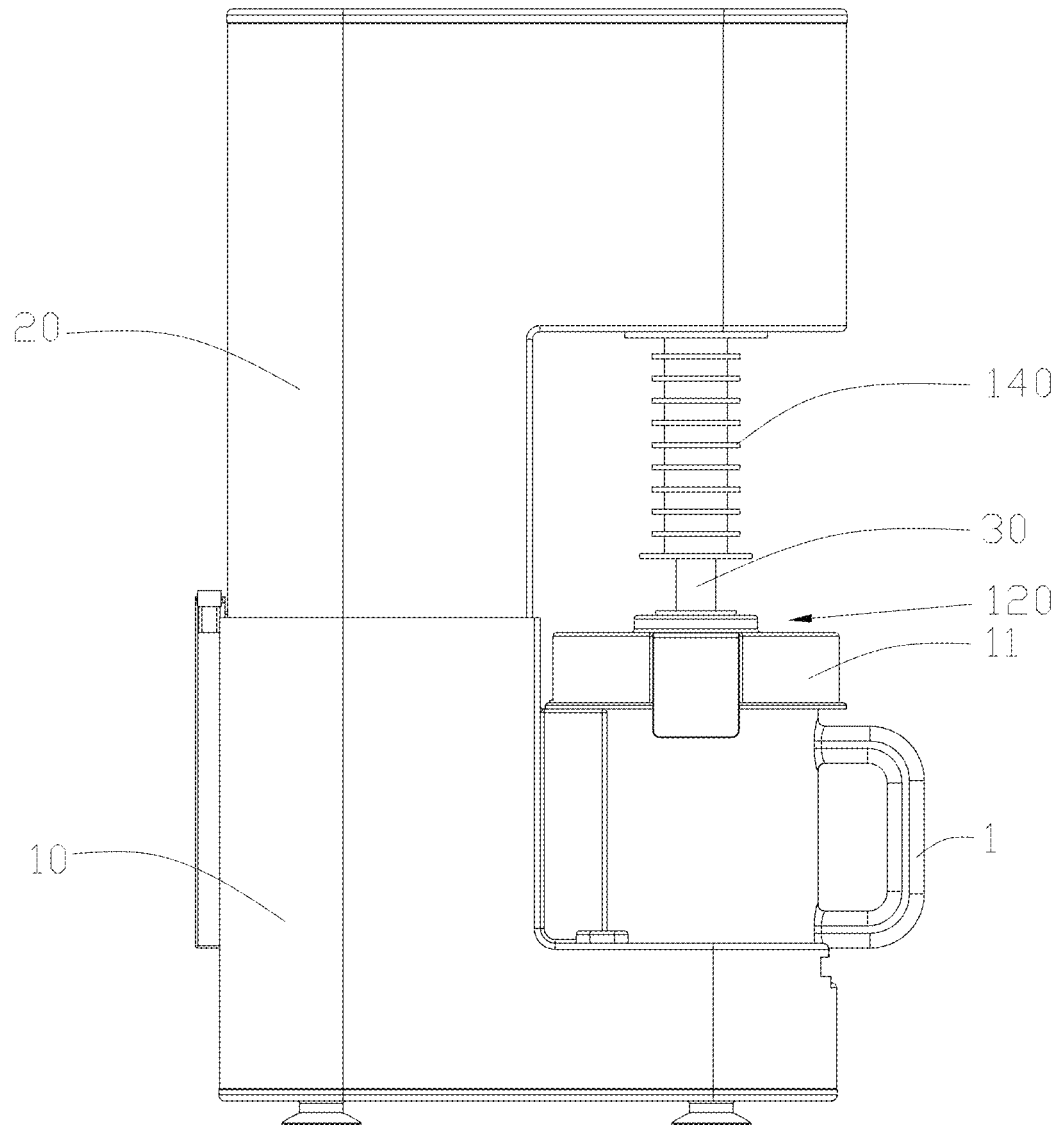
FIG. 26 is a schematic diagram of the planar structure of an ice cream maker of a second embodiment in the first position.

Referring to FIG. 17 and FIG. 18, the upper housing 20 further includes a cutter installation part 21 at a position corresponding to the groove or hole 670, and the cutter installation part 21 allows detachable installation of the cutter 30. The cutter installation part 21 includes a connecting hole part 211, a bracket 212, a sliding clamping piece 213 and an elastic acting piece 214.

A connecting hole 211H is formed through the connecting hole part 211, and the connecting hole 211H connects the groove or hole 670 of the transmission output member 660 to the upper housing 20. The connecting hole 211H allows connection of one end of the cutter 30 away from the cutter head 32, specifically, one end of the outer member 310 away from the cutter 30 is inserted into the connecting hole 211H together with the shaft sleeve 340. A position limiting part 2111 is formed at the bottom of the connecting hole part 211 (i.e., at the end of the side facing towards the cutter). The position limiting part 2111 allows the second flange 342 to pass through and enter into the connecting hole 211H but prevents the first flange 341 from entering into the connecting hole 211H, such that the shaft sleeve 340 abuts against the cutter installation part 21, and the slot 343 enters into a specified position.

The bracket 212 is formed on an outer side of the connecting hole part 211, to install the sliding clamping piece 213 and allow the sliding clamping piece 213 to slide. Moreover, a space for installing the elastic acting piece 214 is formed between the bracket 212 and the connecting hole part 211.

One end of the sliding clamping piece 213 is fixedly connected to a button 215, and a pressing head 2131 which protrudes and extends along the slot 343 is formed on the other end. The pressing head 2131 can be clamped into the slot 2131 between the first flange 341 and the second flange 342.

One end of the elastic acting piece 214 abuts against the sliding clamping piece 213, and another end of the elastic acting piece 214 abuts against the pressing head 2131 of the sliding clamping piece 213 and applies to the pressing head 2131 an acting force towards the side of the button 215. Moreover, when the sliding clamping piece 213 is subjected to a force and moves towards the side of the elastic acting piece 214, the elastic acting piece 214 can be compressed.

When the cutter 30 is installed on the upper housing 20, the connector 350 at one end of the inner cutter shaft 320 of the cutter 30 penetrates through the connecting hole 211H and is engaged with the groove or hole 670 of the second transmission member 60. One end of the outer member 310 of the cutter 30 is inserted into the connecting hole 211H, the shaft sleeve 340 sheathed on the outer member 310 is matched with the connecting hole part 211 and is clamped and fixed with the sliding clamping piece 213 under the effect of the elastic acting piece 214, such that the outer member 310 is fixed to the cutter installation part 21 of the upper housing 20 and the cutter 30 is installed on the upper housing 20. When the cutter 30 is installed on the upper housing 20, the button 215 can be pressed first to move the pressing head 2131 towards the side of the central axis away from the cutter 30, such that the elastic acting piece 214 is compressed, and the shaft sleeve 340 can be inserted into the connecting hole 211H together with the outer member 310 in a state in which the first flange 341 does not abut against the pressing head 2131 or very little abutting resistance exists, then the button 215 is released when the pressing head 2131 is aligned with the slot 343, and under the effect of an elastic force from the elastic acting piece 214, the pressing head 2131 is pushed by the elastic acting piece 214 to move towards the central axis side of the cutter 30 until the pressing head 2131 and the slot 343 are clamped with each other. In addition, the second flange 342 can also be arranged in a manner that the size of protruding in the direction away from the central axis of the cutter 30 becomes smaller as the second flange 342 moves away from the slot 343, thereby facilitating installation of the cutter 30 on the upper housing 20.

When the cutter 30 is detached, the button 215 is first pressed to move the pressing head 2131 towards the side of the central axis away from the cutter 30, such that the elastic acting piece 214 is compressed, then the shaft sleeve 340 can disengage the pressing head 2131 from the slot 343 in a state in which the first flange 341 does not abut against the pressing head 2131 or a little abutting resistance exists, and the outer member 310 and the shaft sleeve 340 are removed from the connecting hole 211H.

Therefore, referring to FIG. 17, during daily use, the cutter 30 can be disassembled for conveniently cleaning the cutter 30, thereby not only facilitating operation but also ensuring sanitary conditions of the cutter shaft 31 and the cutter head 32.

In addition, the cutter shaft 31 is installed with a cover body 11 of a container 1.

The lower housing 10 is provided with a third microswitch 83 configured to detect whether a container 1 is installed in place. The lower housing 10 is provided with a fourth microswitch 84 configured to detect whether a cover body 11 is installed in place.

In addition, the cutter head 32 includes a cutter disk 321, a plurality of cutter ribs 323 extending from the cutter disk 321 towards the circumferential direction, and an outer support hub 325. The cutter disk 321 is connected to the cutter shaft 31, and one end of each of the plurality of cutter ribs 323 away from the cutter disk 321 is connected to the outer support hub 325. In the present embodiment, the cutter head 32 has three cutter ribs 323, each of the three cutter ribs 323 extends for the same length from the cutter disk 321 towards the circumferential direction and the three cutter ribs 323 are arranged at equal intervals. Therefore, the cutter head 32 as a whole is in a disc structure with the cutter disk 321 as a center, thereby effectively inhibiting jittering of the cutter ribs 323 during ice shaving, being capable of shaving thick ice blocks stably during ice shaving, and further improving efficiency of ice shaving.

Each cutter rib 323 is provided with a first cutter surface 3231 and a second cutter surface 3232 which are deviated from each other. Wherein the first cutter surface 3231 is an upper surface with the cutter rib 323 facing towards the cutter shaft 31, and the second cutter surface 3232 is a lower surface with the cutter rib 323 deviating from the cutter shaft 31. Each of the first cutter surfaces 3231 is provided with a first blade portion 324, and each of the second cutter surfaces 3232 is provided with a second blade portion 326. Ice blocks are shaved and mixed by using the first blade portion 324 and the second blade portion 326.

The first blade portion 324 includes at least one mixing blade 3241 arranged on each cutter rib 323 and a first discharging opening 3242 formed between two adjacent mixing blades 3241 and between the mixing blade 3241 and the cutter disc 321. The second blade portion 326 includes at least one ice shaving blade 3261 arranged on each cutter rib 323 and a second discharging opening 3262 formed between two adjacent ice shaving blades 3261 and between the ice shaving blade 3261 and the cutter disc 321. In the present embodiment, an opening 328 is formed between every two adjacent cutter ribs 323.

In the process of stirring and mixing shaved ice, the second cutter surface 3232 first contacts with the ice blocks to shave ice, the ice blocks accommodated at the bottom of the container 1 are shaved by the ice shaving blade 3261, and the shaved ice blocks leak out from the opening 328 and the second discharging opening 3262 or are directly pushed out by the ice shaving blade 3261 and can be brought to the first cutter surface 3231, and then under the driving of the lifting member 70, the first cutter surface 3231 stirs and mixes shaved ice blocks when the cutter 30 moves up, and when the shaved ice blocks are agglomerated again, the first cutter surface 3231 shaves the re-agglomerated ice blocks located between the first cutter surface 3231 and the cover body 11, thereby improving efficiency of making ice cream.

Preferably, the ice shaving blades 3261 on different cutter ribs 323 are staggered in a radius direction. Similarly, the mixing blades 3241 on different cutter ribs 323 are staggered in a radius direction. When the cutter 30 rotates downwards relative to the container 1 to press and shave ice blocks, the ice shaving blades 3261 arranged on different cutter ribs 323 in a staggered manner shave the ice blocks over a large area, thereby further improving efficiency of making ice cream.

Preferably, the mixing blade 3241 and the ice shaving blade 3261 are wedge-shaped with different inclination angles and/or different inclination directions, such that the cutter 30 can shave the ice blocks in different directions and depths during rotation, thereby further improving the shaving rate. As a result, the ice blocks can be shaved at multiple angles and depths, thereby further improving the efficiency of making ice cream.

When the ice cream maker 100 of present disclosure operates normally, under the driving of the driving member 40, the first transmission member 50 and the second transmission member 60 can be driven simultaneously, that is, the driving member 40 can drive the cutter 30 to move up and down and rotate simultaneously. Then since the clamping piece 592 of the clamping member 59 abuts against the first matching part 572C corresponding to the installation groove 572a, the anti-skidding member 53 and the second gear ring 570 rotate synchronously, and drive the lifting member 70 to operate, such that the upper housing 20 and the cutter 30 move up and down relative to the lower housing 10, and the cutter 30 rotates while moving up and down. Suppose that the rotational force output from the second gear ring 570 is F1, the sliding resistance of the anti-skidding member 53 relative to the second gear ring 570 is F2. During normal operation, F2>F1, therefore, the clamping member 59 keeps abutting against the first matching part 572C, and the anti-skidding member 53 tightly abuts against the second gear ring 570 of the gearbox 51 without displacement.

On the other hand, the ice cream maker 100 of present disclosure can include a first microswitch 81 and a second microswitch 82 arranged on the lower housing 10 or the upper housing 20; when the upper housing 20 is at a first position, the first microswitch 81 contacts with and is sensed with the lower housing 10 or the upper housing 20. When the upper housing 20 is at a second position, the second microswitch 82 contacts with and is sensed with the lower housing 10 or the upper housing 20, such that the cutter head 32 can appropriately reach the specified first position and second position, and the cutter head 32 cannot operate beyond the first position and the second position. In the specification, the first position refers to the position at which the upper housing 20 moves to the highest position, that is, the maximum value at which the upper housing 20 can be expanded and retracted, and the second position refers to the position at which the upper housing 20 moves to the lowest position, that is, the minimum value at which the upper housing 20 can be expanded and retracted.

Once the microswitches 81, 82 fail, operation cannot continue when the lifting member 70 moves to its maximum stroke, but the driving member 40 continues to operate and results in an increased load, thereby easily damaging the cutter 30, the driving member 40, the circuit components capable of controlling the driving member 40, the connecting points of various components, etc. Alternatively, when the cutter head 32 is blocked by hard objects such as a hard ice material while traveling downwards to shave ice, the load on the driving member 40 also increases, the cutter 30, the driving member 40, the circuit components capable of controlling the driving member 40, the connecting points of various components and the like are easily damaged. Therefore, in the present disclosure, the first transmission member 50 having an anti-skidding member 53 is adopted as a protective measure. When the load on the driving member 40 increases, the rotational force F1 output from the second gear ring 570 becomes larger, so that F2<F1, then the driving member 40 continues to drive the second gear ring 570 and the cutter 30 to rotate, and at this time, since the sliding resistance F2 of the anti-skidding member 53 with respect to the second gear ring 570 is less than the rotational force F1 output from the second gear ring 570, the first matching part 572C of the second gear ring 570 is disengaged from the second matching part 592s of the clamping member 59, and the second gear ring 570 cannot continue to drive the anti-skidding member 53 to rotate, therefore, the second gear ring 570 rotates while the anti-skidding member 53 remains stationary, the second gear ring 570 idles, and further the lifting member 70 does not move up and down.

Therefore, even if the microswitches 81, 82 fail or the load on the driving member 40 increases due to obstructed operation, since the lifting member 70 will not continue to operate, damage to the ice cream maker 100 can be avoided, and a thread to user safety caused by forcing the lifting member 70 to operate can be avoided. In addition, even if the load on the driving member 40 increases, the driving member 40 continues to drive the cutter head 32 to cut, thereby enabling hard objects to be shredded or thrown away, and also facilitating elimination of elements causing an increase in the load on the driving member 40. During a process in which elements causing an increase in the load on the driving member 40 are eliminated, i.e., the process in which F1 becomes smaller until F2>F1, the clamping member 59 slipping out of the first matching part 572C slides into the neighboring first matching part 572C again under the effect of an elastic force of the elastic piece 591, and the anti-skidding member 53 is clamped into the second gear ring 570 again by the clamping member 59 and rotates synchronously along with the second gear ring 570. The driving structure 101 of the ice cream maker 100 operates normally, and the cutter 30 can simultaneously rotate and move up and down. Therefore, even if the second gear ring 570 slips relative to the anti-skidding member 53, since one end of the first threaded transmission piece 710 abuts against the inner circumferential surface of the installation groove 572a through the side surface of the fixedly connected anti-skidding member 53, another end of the first threaded transmission piece 710 is in threaded connection with the second threaded transmission piece 720, therefore, the anti-skidding member 53 and the first threaded transmission piece 710 remain unchanged, and the anti-skidding member 53 will not be disengaged downwardly from the installation groove 572a, and the anti-skidding member 53 and the ice cream maker 100 can be utilized again when the second gear ring 570 rotates to the point where the first matching part 572C is opposite to the clamping member 59. Therefore, according to the embodiment of the present disclosure, it is possible to avoid damage to the anti-skidding member 53 and the ice cream maker 100 caused by overloading of the driving member 40 of the ice cream maker 100. Moreover, after using protective measures, the lifting function of the ice cream maker 100 can be used continuously with no need of dismantling the ice cream maker for maintenance, and protective measures can be adopted again.

Moreover, since the first locating groove 531d and the second locating groove 592d are set, the elastic piece 591 is not easily displaced and loosened from between the sleeve-connected portion 531 and the clamping piece 592 even during a process in which the clamping member 59 slips out of the first matching part 572C and re-enters one of the at least one first matching part 572C.

The sliding resistance generated by an elastic force applied to the second gear ring 570 by the clamping member 59 of the anti-skidding member 53 can also be changed to a sliding resistance generated by a magnetic attraction force generated by a pair of magnetic elements. Specifically, the second gear ring 570 includes at least one first magnetic transmission element 52, and the anti-skidding member 53a includes a sleeve-connected portion 531a and at least one second magnetic transmission element 58 installed on the sleeve-connected portion 531a.

The first magnetic transmission element 52 and the second magnetic transmission element 58 are arranged opposite to each other and are magnetically attracted to each other, at this time, the sliding resistance of the anti-skidding member 53 relative to the second gear ring 570 is F2. During normal operation, F2>F1, therefore, the non-skidding member 53a is installed in the installation groove 572a of the second gear ring 570 in a manner of keeping the first magnetic transmission element 52 and the second magnetic transmission element 58 opposite to each other, and the non-skidding member 53 tightly abuts against the second gear ring 570 of the gearbox 51 without displacement.

The anti-skidding member 53a drives the lifting member 70 to operate. The first magnetic transmission element 52 can be embedded into the second gear ring 570 through the first groove 571, and the second magnetic transmission element 58 can be embedded into the sleeve-connected portion 531a through the second groove 5311, and the anti-skidding member 53 and the second gear ring 570 rotate synchronously, such that the anti-skidding member 53 drives the lifting member 70 to operate. The first magnetic transmission element 52 and the second magnetic transmission element 58 are both magnets, the number of which is set according to different magnetic requirements. The first magnetic transmission element 52 and the second magnetic transmission element 58 are arranged in an upper-lower mirror image and left-right mirror image with respect to a plane perpendicular to the central axis of the first transmission member 50, but are not limited hereto, and the first magnetic transmission element 52 and the second magnetic transmission element 58 can also be uniformly arranged along the circumferential direction of the first transmission member 50.

In case of failure of the limit switch, when the load on the driving member 40 increases, the rotational force F1 output from the second gear ring 570 becomes larger, so that F2<F1, at this time, the driving member 40 continues to drive the second gear ring 570 and the cutter 30 to rotate, and at this time, since the sliding resistance F2 of the anti-skidding member 53a relative to the second gear ring 570 is less than the rotational force F1 output by the second gear ring 570, the first magnetic transmission element 52 is misaligned with the second magnetic transmission element 58, such that the second gear ring 570 cannot continue to drive the anti-skidding member 53a to rotate, the second gear ring 570 rotates while the anti-skidding member 53a remains stationary, then the second gear ring 570 idles, and further the lifting member 70 does not move up and down.

Therefore, even if the limit switch fails or the load on the driving member 40 increases due to obstructed operation, since the lifting member 70 will not continue to operate, damage to the ice cream maker 100 can be avoided, and a thread to user safety caused by forcing the lifting member 70 to operate can be avoided. In addition, even if the load on the driving member 40 increases, the driving member 40 continues to drive the cutter head 32 to cut, thereby enabling hard objects to be shredded or thrown away, and also facilitating elimination of elements causing an increase in the load on the driving member 40. During a process in which elements causing an increase in the load on the driving member 40 are eliminated, i.e., a process in which F1 becomes smaller until F2>F1, the at least one first magnetic transmission element 52 is magnetically matched again with the at least one second magnetic transmission element 58, and the anti-skidding member 53a rotates synchronously again along with the second gear ring 570. The driving structure 101 of the ice cream maker 100 operates normally, and the cutter 30 can rotate and move up and down simultaneously. Therefore, according to the embodiment of the present disclosure, it is possible to avoid damage to the anti-skidding member 53a and the ice cream maker 100 caused by overloading of the driving member 40 of the ice cream maker 100. Furthermore, after using protective measures, the lifting function of the ice cream maker 100 can be used continuously with no need of dismantling the ice cream maker for maintenance, and protective measures can be adopted again.

Second Embodiment

Referring to FIGS. 26-33, the ice cream maker 100A includes a lower housing 10 and an upper housing 20. The upper housing 20 is movably disposed relative to the lower housing 10, with a placement area 120 between the lower housing 10 and the upper housing 20 for placing a cup 1. A rotatable paddle shaft 31 is disposed on the upper housing above the placement area 120, with a paddle head 32 at the lower end of the paddle shaft 31.

The upper housing 20 houses a motor 40 having a first output shaft 410a and a second output shaft 410b. The motor 40 drives the upper housing 20 to move up and down relative to the lower housing 10 between the first and second positions, and drives the paddle shaft 31 to rotate in the forward or reverse direction. The first output shaft 410a is drivingly connected to the paddle shaft 31.

Inside the ice cream maker 100A, a screw lifting mechanism 70 is provided which drives the upper housing 20 to move up and down relative to the lower housing 10. The screw lifting mechanism 70 includes a screw 710 fixedly installed inside the lower housing 10 and extending upwardly into the upper housing 20. A screw nut 720 is rotatably disposed inside the upper housing 20, the screw nut 720 is threadedly connected to the screw 710, and the second output shaft 410b is drivingly connected to the screw nut 720.

The ice cream maker 100A is provided with a first microswitch 81 and a second microswitch 82. The upper housing 20 is sensed with the first microswitch 81 when in the first position, and the upper housing 20 is sensed with the second microswitch 82 when in the second position.

The lower housing 10 is equipped with a weighing module 130 in contact with the cup 1. The weighing module 130 senses the weight of the cup 1 and outputs a weight value as G.

The paddle shaft 31 is provided with a cup cover 11 that can cover the cup 1. A compression spring 140 (e.g., an outer cutter shaft) is sheathed on the paddle shaft 31, with an upper end in contact with the upper housing 20. Above the compression spring 140 on the upper housing 20, a pressure sensor 85 is in close contact with the compression spring 140. The lower end of the compression spring 140 can be in contact with the upper end face of the cup cover 11 and transmit pressure to the detection end of the pressure sensor 85 in real time. The pressure sensor 85 is used to detect the real-time pressure of the compression spring 140 and outputs a pressure value as F.

The control method of the ice cream maker 100A includes: the ice cream maker 100A enters an operating state and controls the motor 40 to drive the upper housing 20 from the first position to the second position based on the pressure value F and the weight value G. The movement of the upper housing from the first position to the second position includes at least one downward churning stroke and one upward mixing stroke.

In the downward churning stroke, the upper housing 20 moves downward relative to the lower housing 10 and the paddle shaft 31 rotates in a first direction. In the upward mixing stroke, the upper housing 20 moves upward relative to the lower housing 10 and the paddle shaft 31 rotates in a second direction.

In the downward churning stroke, the rotation speed of the paddle shaft 31 is $V1=K1 \times F$, the downward speed of the upper housing 20 is $V2=X \times V1$, and the downward time is T1.

In the upward mixing stroke, the rotation speed of the paddle shaft 31 is $V3=K2 \times F$, the upward speed of the upper housing 20 is $V4=X \times V3$, and the upward time is T2.

Wherein, K1 is a forward rotation coefficient, K2 is a backward rotation coefficient, X is a motion coefficient, F is a pressure value, and K1 and K2 are both inversely proportional to G, wherein the inverse ratio setting can achieve a smaller K value when the weight value G is larger. This means that when the ice mixture in the cup 1 is heavier, the rotation speed and downward speed of the paddle shaft will be slower, thus achieving intelligent churning and descent based on the weight of the ice mixture, which not only improves the flavor of the ice cream but also effectively protects the motor.

Figure 33:
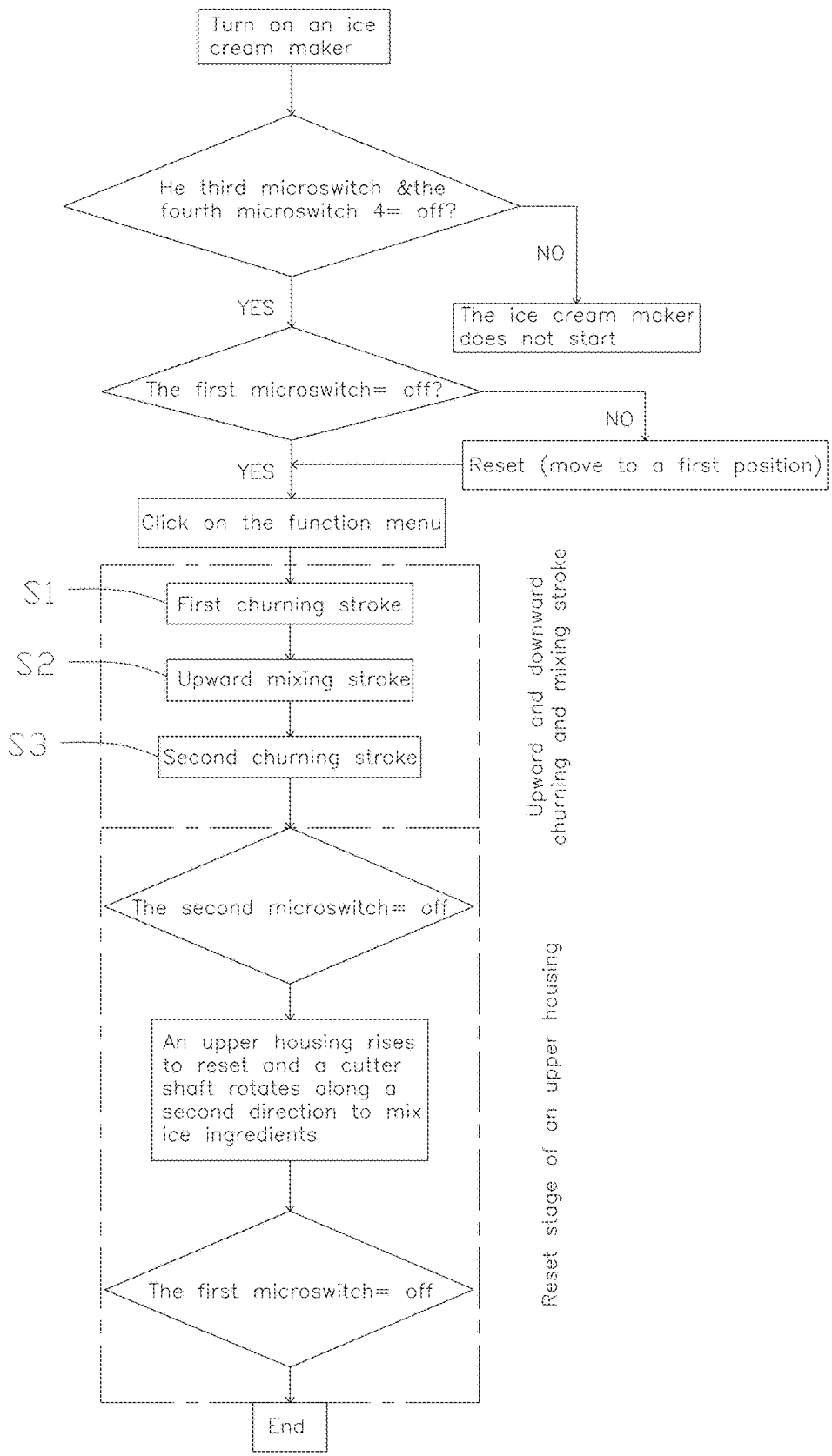
FIG. 33 is an operational principles diagram of the ice cream maker of the second embodiment.

Referring to FIG. 33, the operations of the ice cream maker 100A are as follows:

S1: The motor 40 drives the upper housing 20 to perform the first downward churning stroke.

In the first downward churning stroke, the upper housing 20 moves downward relative to the lower housing 10 and the paddle shaft 31 rotates in the first direction. During this rotation, the shaving blade edge of the paddle head 32 contacts the ice mixture to perform a grinding action.

S2: Upon completion of the first downward churning stroke, the upward mixing stroke is carried out.

In the upward mixing stroke, the upper housing 20 moves upward relative to the lower housing 10 and the paddle shaft 31 rotates in the second direction. During this rotation, the paddle head 32 moves upward, and during the rotation, the mixing blade edge disperses the shaved ice mixture such that the ice mixture can be thoroughly mixed with the air in the cup.

S3: Upon completion of the upward mixing stroke, the second downward churning stroke is carried out.

In the second downward churning stroke, the upper housing 20 moves downward relative to the lower housing 10 and the paddle shaft 31 rotates in the first direction. During this rotation, the shaving blade edge of the paddle head 32 contacts the ice mixture to perform the grinding action.

S4: Cycling through steps S1-S3 until the upper housing 20 moves to the second position to control the motor 40 to drive the upper housing 20 to move from the second position to the first position and to rotate the paddle shaft 31 in the second direction to remix the ice mixture, thereby completing the operation.

In the present disclosure, the first output shaft 410a is drivingly connected to the paddle shaft 31 by a belt 680, and the second output shaft 410b is drivingly connected to the screw nut 720 by an epicyclic gear set 51.

Furthermore, X is 0.03 to achieve a slower upper housing movement speed than the paddle shaft rotation speed, allowing the paddle head to move slowly during high-speed grinding to ensure sufficient ice shaving.

Figure 30:
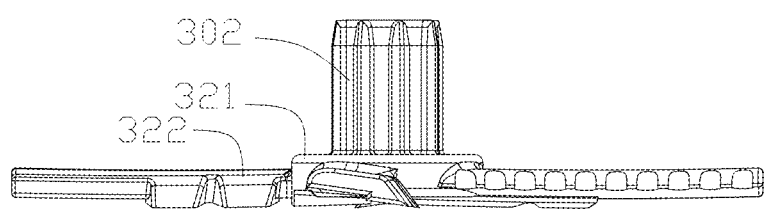
FIG. 30 is one of the schematic diagrams of the partial structure of the ice cream maker shown in FIG. 26.
Figure 31:
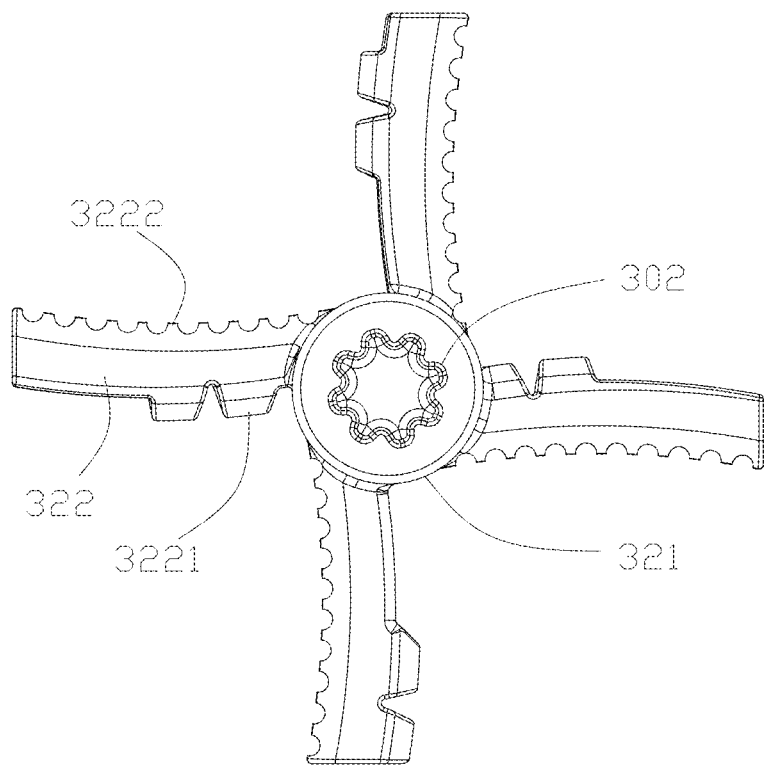
FIG. 31 is another schematic diagram of the partial structure of the ice cream maker shown in FIG. 26.

Referring to FIGS. 30-31, an installation shell (not shown in the figures) is fixedly installed within the upper housing 20, and the screw nut (not shown in the figures) is rotatably disposed within the installation shell. The installation shell can be assembled into the upper housing 20 using screws.

Figure 27:
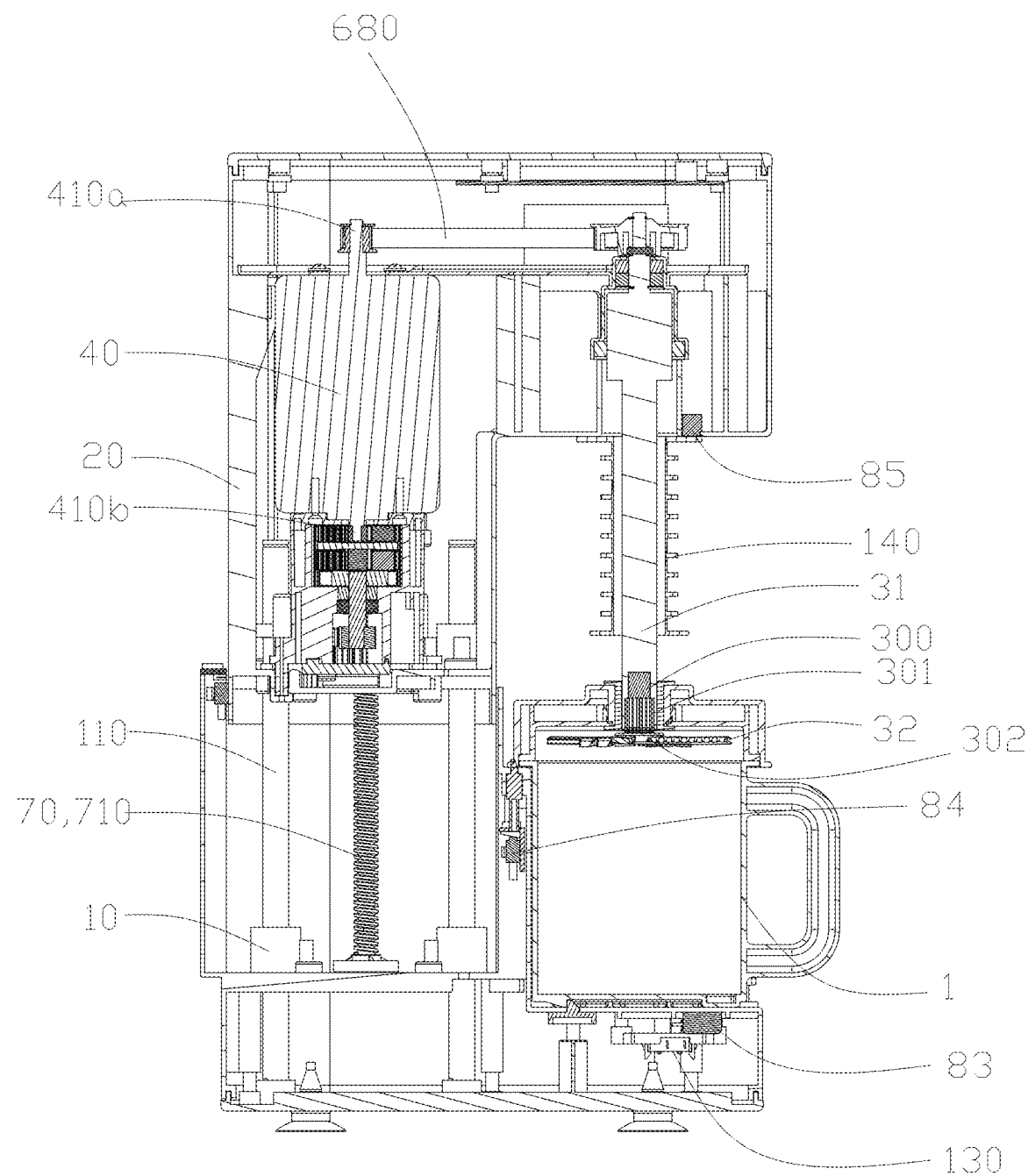
FIG. 27 is a schematic diagram of the sectional structure of the ice cream maker shown in FIG. 26 in the first position.
Figure 28:
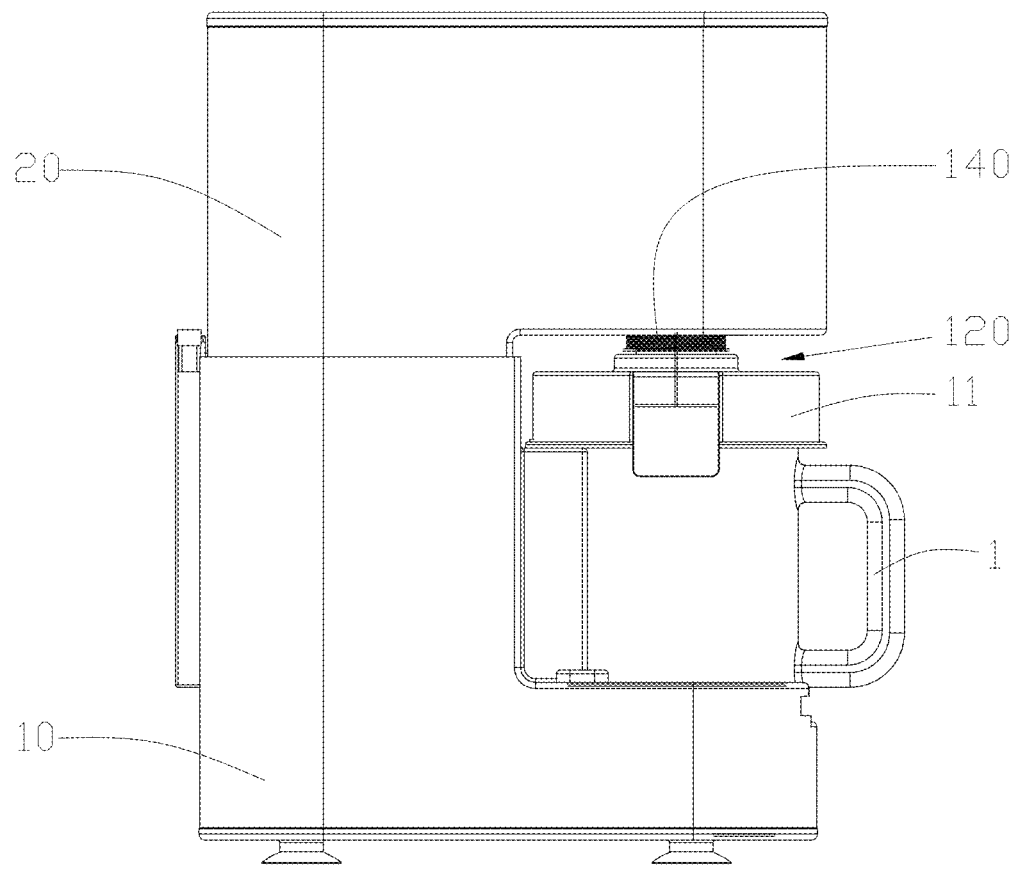
FIG. 28 is a schematic diagram of the planar structure of the ice cream maker shown in FIG. 26 in the second position.
Figure 29:
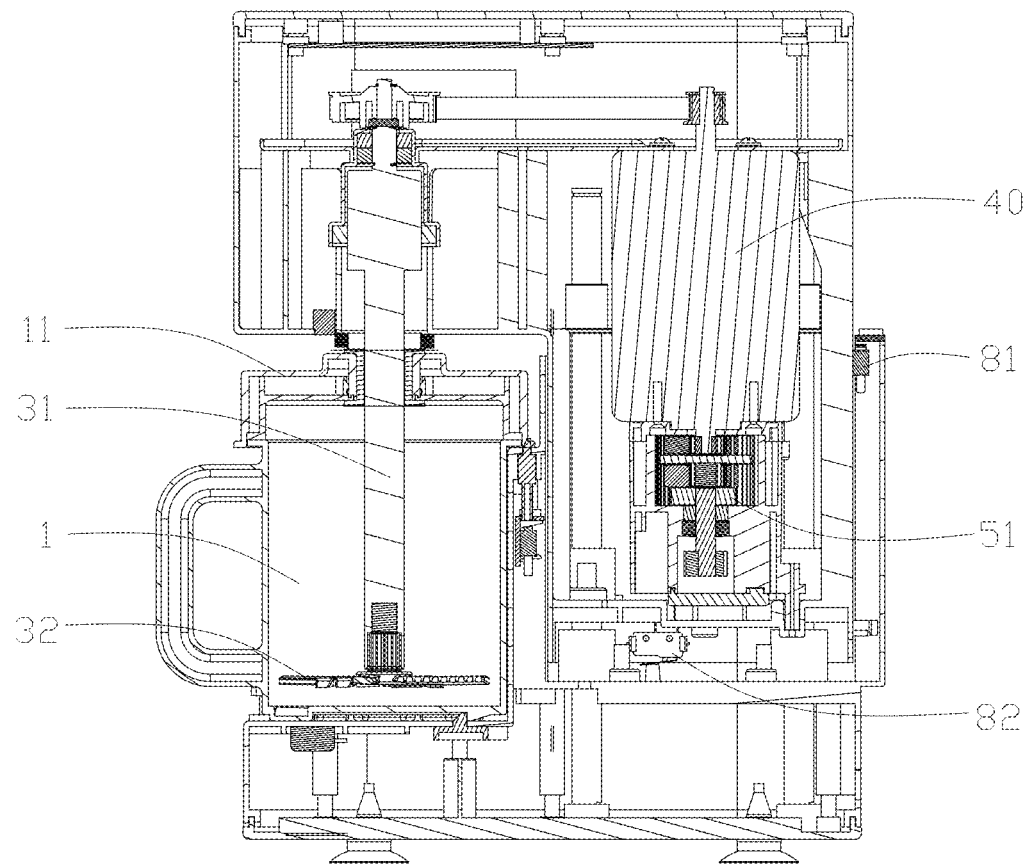
FIG. 29 is a schematic diagram of the sectional structure of the ice cream maker shown in FIG. 26 in the second position.

Referring to FIG. 27, guide columns 110 are installed within the lower housing 10, and the upper housing 20 is slidably connected to the guide columns 110. During ascent and descent, the upper housing 20 moves relative to the guide columns 110.

In the present disclosure, the paddle shaft 31 is magnetically coupled to the paddle head 32.

Figure 32:
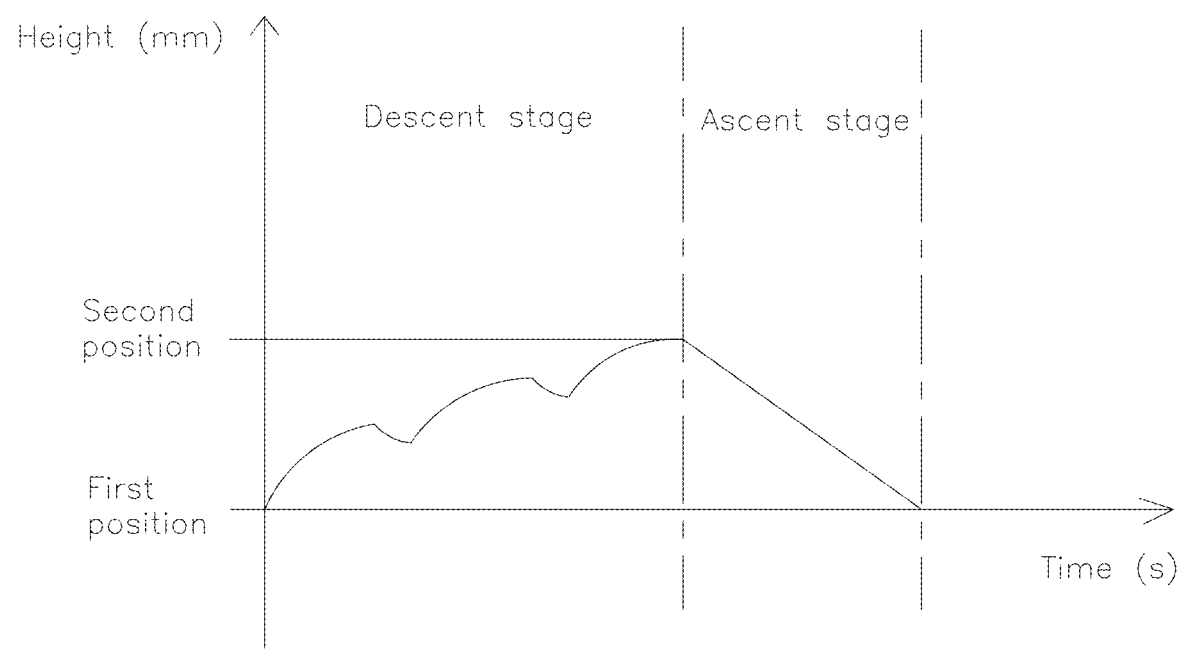
FIG. 32 is a run chart of the movement of the upper housing of the ice cream maker of the second embodiment between the first and second positions.

Referring to FIG. 27 and FIG. 32, the lower end of the paddle shaft 31 is provided with a coupling cavity 301, and a coupling portion 302 is provided on the paddle head 32. The coupling portion 302 is inserted into the coupling cavity 301, and a magnetic member 300 magnetically attracting with the coupling portion 302 is provided in the coupling cavity 301.

Referring to FIG. 30-31, the paddle head 32 includes a paddle disc 321. The coupling portion 302 is disposed on the paddle disc 321, and multiple blades 322 are arranged along the circumferential array of the paddle disc 321. The blades 322 are each provided with ice shaving blade edges 3221 and mixing blade edges 3222 on opposite sides.

During the descent of the paddle head 32, the paddle head 32 rotates forward and the ice shaving blade edges 3221 grind and shave the ice cream material in the cup 1 to convert the top surface of the ice block to a fine ice mixture. As the paddle head 32 ascends and reverses, the mixing blade edges 3222 come into contact with the ice mixture. In this process, the mixing blade edges 3222 can effectively disperse the shaved ice mixture, allowing the ice mixture to be thoroughly mixed with the air in the cup, making the ice mixture denser and thus improving the flavor of the ice cream.

The placement area 120 is provided with a third microswitch 83 and a fourth microswitch 84 for detecting the cup 1.

The contents not described in detail in this specification are known to those skilled in the art.

In the description of the present disclosure, it should be understood that terms such as "center", "longitudinal", "lateral", "length", "width", "thickness", "top", "bottom", "front", "rear", "left", "right", "vertical", "horizontal", "upper", "lower", "inner", "outer", "clockwise", "counterclockwise", etc., indicate the orientation or positional relationship based on the orientation or positional relationship shown in the drawings. These terms are used for descriptive purposes and are not to be construed as limiting, indicating, or implying any particular orientation, construction or operation for the devices or components referred to. Therefore, it should be understood that the terms "first," "second," etc., are used for descriptive purposes only and do not imply or suggest any relative importance or indicate the quantity of technical features indicated.

The foregoing illustrates and describes the basic principles and main features of the present disclosure and its advantages. Those skilled in the art should understand that the present disclosure is not limited to the embodiments described above. The embodiments and descriptions in the specification are intended only to illustrate the principles of the present disclosure. Within the scope and spirit of the present disclosure, various modifications and improvements can be made which fall within the scope of protection defined by the appended claims and their equivalents.

What is claimed is:

1. A device comprising:
    a cutter configured for mixing and cutting food materials;
    a driving structure for converting electrical energy into kinetic energy;
    a lifting member driven by the driving structure to move in a longitudinal direction of the lifting member; and
    a receiving cavity configured for accommodating the driving structure and the lifting member, and formed by an upper housing and a lower housing;
    wherein the cutter is detachably connected to the upper housing; the upper housing is driven by the lifting member to move in the longitudinal direction so as to vary a distance in the longitudinal direction between a top end of the upper housing and a bottom end of the lower housing.

2. The device according to claim 1, wherein the driving structure is installed within the upper housing and comprises a driving member for outputting kinetic energy generated based on electrical energy;
    the driving member is connected to the cutter and the lifting member, such that the lifting member drives the upper housing and the cutter to move up and down relative to the lower housing and drives the cutter to rotate.

3. The device according to claim 2, wherein the driving member comprises an output shaft configured to drive the cutter and the lifting member to move.

4. The device according to claim 2, wherein the driving structure further comprises a first transmission member and a second transmission member, the first transmission member and the second transmission member are connected to the driving member and transmit kinetic energy,
    the first transmission member is connected to the lifting member and configured to drive the lifting member to move up and down relative to the lower housing, so as to drive the cutter to move up and down, and
    the second transmission member is connected to the cutter and configured to drive the cutter to rotate.

5. The device according to claim 4, wherein the first transmission member comprises a gearbox, the gearbox comprises an input end connected to the driving member, and an output end configured to drive the lifting member to move.

6. The device according to claim 5, wherein the gearbox comprises:
    a plurality of planet gears, wherein the plurality of planet gears is engaged with each other, and surrounds one output shaft of the driving member and is engaged with the output shaft;
    a first gear ring, wherein an inner circumferential surface of the first gear ring is engaged with the plurality of planet gears and a rotation of the first gear ring is limited; and
    a second gear ring engaged with the plurality of planet gears, wherein
    the output end protrudes from one side, away from the first gear ring, of the second gear ring, and
    under the driving of the output shaft, the plurality of planet gears performs revolution around the output shaft while autorotating, to drive the output end to rotate around the output shaft.

7. The device according to claim 5, wherein the first transmission member further comprises an anti-skidding member,
    the output end of the gearbox is detachably connected to the anti-skidding member, and the anti-skidding member is configured to connect the lifting member with the output end of the gearbox, such that the output end of the gearbox drives the lifting member to move up and down.

8. The device according to claim 7, wherein the anti-skidding member comprises a sleeve-connected portion and at least one clamping member movably installed on the sleeve-connected portion,
    the sleeve-connected portion is fixedly connected to the lifting member, and the at least one clamping member is elastically sandwiched between the sleeve-connected portion and the output end, such that under the rotation of the output end, the anti-skidding member drives the lifting member to operate.

9. The device according to claim 8, wherein the at least one clamping member comprises an elastic piece and a clamping piece,
one end of the elastic piece is connected to the sleeve-connected portion, and another end of the elastic piece is connected to the clamping piece, such that the elastic piece is sandwiched between the sleeve-connected portion and the clamping piece, and the clamping piece abuts against the output end under the effect of the elastic piece.

10. The device according to claim 7, wherein the output end of the gearbox comprises at least one first magnetic transmission element,
the anti-skidding member comprises a sleeve-connected portion and at least one second magnetic transmission element installed on the sleeve-connected portion, and
the at least one first magnetic transmission element and the at least one second magnetic transmission element are arranged opposite to each other and are magnetically pulled towards each other, such that under the driving of the output end, the anti-skidding member drives the lifting member to operate.

11. The device according to claim 4, wherein the second transmission member comprises a plurality of gears and a gear carrier, and the plurality of gears comprises a first gear, a second gear, a third gear, a fourth gear and a fifth gear which are connected in sequence, the first gear is connected to one output shaft of the driving member, and the fifth gear is detachably connected to the cutter.

12. The device according to claim 4, wherein the lifting member comprises a first threaded transmission piece and a second threaded transmission piece which are in threaded connection, and
the second threaded transmission piece is fixedly connected to the lower housing, the first threaded transmission piece is connected to the second transmission member, the second transmission member drives the first threaded transmission piece to move relative to the second threaded transmission piece, such that the first threaded transmission piece drives the upper housing to move up and down relative to the lower housing.

13. The device according to claim 12, wherein
the lifting member further comprises a first guide rod and a second guide rod sheathed with the first guide rod,
the first guide rod is fixedly installed within the upper housing and sheathed on the first threaded transmission piece, such that the first guide rod moves up and down synchronously with the upper housing and the first threaded transmission piece, and the second guide rod is fixed to the lower housing, the first guide rod is movably sheathed to the second guide rod, and under the driving of the first threaded transmission piece, the first guide rod slides relative to the second guide rod.

14. The device according to claim 1, wherein the cutter comprises a cutter shaft and a cutter head,
one end of the cutter shaft is detachably installed in the upper housing, and another end of the cutter shaft and the cutter head are integrally formed.

15. The device according to claim 14, wherein the cutter shaft comprises an outer member with a hollow space and an inner cutter shaft which is sheathed in the hollow space of the outer member and rotatably connected to the outer member,
one end of the inner cuter shaft is detachably connected to the driving structure, another end of the inner cuter shaft is connected to the cutter head, and under the driving of the driving structure, the inner cutter shaft rotates relative to the outer member and drives the cutter head to rotate.

16. The device according to claim 15, wherein the cutter head comprises:
a shaft portion,
a plurality of cutter ribs extending towards a circumferential direction along the shaft portion; and
an outer support hub connecting one end, away from the shaft portion, of each of the plurality of cutter ribs.

17. The device according to claim 16, wherein each of the cutter ribs comprises a first cutter surface and a second cutter surface arranged opposite to the first cutter surface,
a plurality of mixing blades is arranged at intervals on the first cutter surface of each of the cutter ribs, and
a plurality of ice shaving blades is arranged at intervals on the second cutter edge of each of the cutter ribs.

18. The device according to claim 14, wherein the cutter shaft is movably sheathed with a cover body,
the lower housing is detachably installed with a container, and
when the cutter descends into the container, the cover body is connected to the container.

19. The device according to claim 15, wherein a shaft sleeve is arranged on an end, away from the cutter head, of the outer member, a first flange and a second flange protrude from the shaft sleeve, and the first flange and the second flange are detachably clamped on the upper housing.

20. The device according to claim 2, wherein the driving member comprises a motor, an output shaft protrudes from one side of the motor, and both the cutter and the lifting member are connected to the output shaft to drive the cutter and the lifting member.

* * * * *

UNITED STATES PATENT AND TRADEMARK OFFICE
CERTIFICATE OF CORRECTION

| | | |
|---|---|---|
| PATENT NO. | : 12,376,605 B2 | Page 1 of 1 |
| APPLICATION NO. | : 18/799101 | |
| DATED | : August 5, 2025 | |
| INVENTOR(S) | : Long Li et al. | |

It is certified that error appears in the above-identified patent and that said Letters Patent is hereby corrected as shown below:

On the Title Page

Please replace the sixth item (30) regarding "Foreign Application Priority Data" on page 2 with the following:
May 20, 2024 (CN)......................202421105970.3

Signed and Sealed this
Twenty-first Day of October, 2025

John A. Squires
*Director of the United States Patent and Trademark Office*